US006795567B1

(12) United States Patent
Cham et al.

(10) Patent No.: US 6,795,567 B1
(45) Date of Patent: Sep. 21, 2004

(54) METHOD FOR EFFICIENTLY TRACKING OBJECT MODELS IN VIDEO SEQUENCES VIA DYNAMIC ORDERING OF FEATURES

(75) Inventors: Tat-Jen Cham, Boston, MA (US); James Matthew Rehg, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/565,414

(22) Filed: May 5, 2000

Related U.S. Application Data

(60) Provisional application No. 60/154,385, filed on Sep. 16, 1999.

(51) Int. Cl.[7] ................................................. G06K 9/00
(52) U.S. Cl. ........................................................ 382/103
(58) Field of Search ................................. 382/103, 107, 382/155–159, 236, 224–228, 181–190, 276, 286; 345/419–420, 473–474

(56) References Cited

U.S. PATENT DOCUMENTS

| | | | |
|---|---|---|---|
| 4,513,286 A | | 4/1985 | Irabu |
| 5,430,445 A | | 7/1995 | Peregrim et al. |
| 5,687,286 A | | 11/1997 | Bar-Yam |
| RE36,041 E | | 1/1999 | Turk et al. |
| 5,995,639 A | * | 11/1999 | Kado et al. ................. 382/118 |
| 6,188,776 B1 | | 2/2001 | Covell et al. |
| 6,269,172 B1 | | 7/2001 | Rehg et al. |
| 6,353,679 B1 | | 3/2002 | Cham et al. |
| 6,377,263 B1 | * | 4/2002 | Falacara et al. ............ 345/473 |

OTHER PUBLICATIONS

Morris, D.D and Rehg, J.M., "Singularity Analysis for Articulated Object Tracking," In *Proc. IEEE Conf. on Computer Vision and Pattern Recognition*, pp. 289–296, Jun. 1998.

Akra, Mohamed, et al., "Sampling of Images for Efficient Model–Based Vision," *IEEE Transactions on Pattern Analysis and Machine Intelligence*, vol. 21, No. 1, Jan., 1999, pp. 4–11.

Coutaz, J., et al., "Coordination of Perceptual Processes for Computer Mediated Communication," *Published in the proceedings of the 2nd international conference on Automatic Face and Gesture Recognition, Killington, Vermont, Oct. 1996*, pp. 106–111.

Toyama, K., et al., "Incremental Focus of Attention for Robust Visual Tracking," *CVPR96 1996*, pp. 189–195.

Rowley, H.A., et al., "Neural Network–Based Face Detection," *IEEE Transactions on Pattern Analysis and Machine Intelligence*, vol. 20, No. 1, Jan. 1998, pp. 23–38.

(List continued on next page.)

*Primary Examiner*—Leo Boudreau
*Assistant Examiner*—Tom Y. Lu

(57) ABSTRACT

An object model has a plurality of features and is described by a model state. An unregistered feature of the object model, and an available frame from a sequence of images are selected to minimize a cost function of a subsequent search for a match of the selected model feature to the image in the selected frame. Upon a match, the feature is registered in that frame. The model state is then updated for each available frame. The steps of selecting, searching and updating are repeated. A video storage module may contain only one frame corresponding to a single time instance, in which case the framework used is based on integrated sequential feature selection. Alternatively, the video store may contain the entire video sequence, in which case feature selection is performed across all video frames for maximum tracking efficiency. Finally, the video store may contain a small number of previous frames plus the current frame, in which case feature selection spans only a subset of the entire video sequence for each feature matching cycle.

88 Claims, 25 Drawing Sheets

OTHER PUBLICATIONS

Brown, L.G., "A Survey of Image Registration Techniques," *ACM Computer Surveys,* vol. 24, No. 4, Dec. 1992, pp. 325–376.

Hel–Or, Y., et al., "Constraint Fusion for Recognition and Localization of Articulated Objects," *International Journal of Computer Vision,* 19(1), 5–28 (1996).

Wixon, L.E., et al., "Using Intermediate Objects to Improve the Efficiency of Visual Search," *International Journal of Computer Vision,* 12:2/3, 209–230 (1994).

Cham, T.J., et al., "A Statistical Framework for Long–Range Feature Matching in Uncalibrated Image Mosaicing," *In Proc. Conf. Computer Vision and Pattern Recognition,* pp. 442–447, Santa Barbara, CA, 1998.

Hauck, A., et al., "Hierarchical Recognition of Articulated Objects from Single Perspective Views," *1997 IEEE,* pp. 870–876.

Oliver, N., et al., "LAFTER: Lips and Face Real Time Tracker," *1997 IEEE,* pp. 123–129.

Irani, M., et al., "Mosaic Based Representations of Video Sequences and Their Applications," *Proc. 5th Int. Conf. Computer Vision,* 1995, pp. 605–611.

Cham, T.J., "A Multiple Hypothesis Approach to Figure Tracking," In *Proc. IEEE Conf. on Computer Vision and Pattern Recognition,* pp. 239–245, Fort Collins, CO, Apr. 1999.

\* cited by examiner

|  | Model Feature | Available | Ambiguity |
|---|---|---|---|
| Frame K | Right Forearm | 1 | 0.2 |
|  | Torso | 0 | 0.5 |
|  | ⋮ | ⋮ | ⋮ |
| Frame K+1 | Right Forearm | 1 | 0.4 |
|  | Torso | 1 | 0.7 |
|  | ⋮ | ⋮ | ⋮ |
| Frame K+2 |  |  |  |
|  | ⋮ | ⋮ | ⋮ |

FIG. 16

METHOD FOR EFFICIENTLY TRACKING OBJECT MODELS IN VIDEO SEQUENCES VIA DYNAMIC ORDERING OF FEATURES

RELATED APPLICATION

This application claims the benefit of U.S. Provisional Application No. 60/154,385 filed Sep. 16, 1999.

BACKGROUND OF THE INVENTION

There is a large class of applications that depend upon the ability to localize a model of an object in an image, a task known as "registration." These applications can be roughly categorized into detection, alignment, and tracking problems.

Detection problems involve, for example, finding objects in image databases or finding faces in surveillance video. The model in a detection problem is usually generic, describing a class of objects. For example, in a prior art face detection system, the object model is a neural network template that describes all frontal, upright faces. See Rowley et al., "Neural network-based face detection", IEEE Transactions on Pattern Analysis and Machine Intelligence, 20(1), pages 23–38, January 1998. Another example is locating armored vehicles in images for a military targeting system.

An example of an alignment application is mosaicing, in which a single large image is constructed from a series of smaller overlapping images. In this application, each model is simply an image to be added incrementally to the mosaic. The alignment goal is to position each new image so that it is consistent with the current mosaic wherever the two overlap. A description is given in Irani et al., "Mosaic based representations of video sequences and their applications," Proceedings of Int. Conference on Computer Vision, pages 605–611, Cambridge, Mass., 1995.

Another example is the alignment of plural images obtained from different sensors, e.g. aligning remote-sensed images obtained via normal and infra-red photography, or aligning MRI and SPECT medical images. This allows different regions of an image to be analyzed via multimodal (i.e., vector) measurements instead of scalar pixel intensities. These and other applications are further discussed in the survey on image registration, Brown, "A survey of image registration techniques," ACM Computing Surveys, 24(4), pages 325–376, 992.

In tracking applications, the models are typically specific descriptions of an image object that is moving through a video sequence. Examples include tracking people for surveillance or user-interface purposes. In figure tracking for surveillance, a stick-figure model of a person evolves over time, matched to the location of a person in a video sequence. A representative prior method is Cham et al., "A multiple hypothesis approach to figure tracking," Proceedings Computer Vision and Pattern Recognition, pages 239–245, Fort Collins, Colo., 1999. In user-interface applications, the user's gaze direction or head pose may be tracked to determine their focus-of-attention. A prior method is described in Oliver et al., "LAFTER: Lips and face real time tracker," Proceedings Computer Vision and Pattern Recognition, pages 123–129, San Juan, PR, Jun. 17–19, 1997.

In each of these application areas, there is a desire to handle increasingly sophisticated object models, which is fueled by the increasing demand for sensing technologies. For example, modern user interfaces may be based on tracking the full-body pose of a user to facilitate gesture recognition. As the complexity of the model increases, the computational cost of registration rises dramatically. A naive registration method such as exhaustive search would result in a slow, inefficient system for a complex object like the human figure. However a fast and reliable solution would support advanced applications in content-based image and video editing and retrieval, surveillance, advanced user-interfaces, and military targeting systems.

Therefore, there is a need for a registration method which is computationally efficient in the presence of complex object models.

SUMMARY OF THE INVENTION

The invention describes a method for efficiently tracking object models in a video or other image sequence.

Accordingly, tracking an object model in a sequence of frames where the object model comprises a plurality of features and is described by a model state, includes both selecting an unregistered feature of the object model and selecting an available frame from the sequence of frames, to minimize a cost function of a subsequent search. A search is performed for a match of the selected model feature to the image in the selected frame in order to register the feature in that frame. The model state is then updated for each available frame. The steps of selecting, searching and updating are repeated.

In an embodiment where at any given time only one frame is available, and where frames are available in sequential order, features of the object model are iteratively registered in the available frame. Each iteration includes the steps of selecting, searching, updating with respect to the available frame. This step is terminated, and the next frame is acquired. A state prior is predicted for the next frame, using a most recent state update. Finally, the steps of iteratively registering, terminating, acquiring and predicting, are repeated. Upon each repetition, features are registered responsive to the state prior predicted by the previous repetition.

Iteratively registering features can include selecting an unregistered feature of the object model to minimize a cost function of a subsequent search. A search is performed for a match of the selected model feature to the image to register the feature. The model state is updated. Finally, the steps of selecting, searching and updating are repeated.

A list of model features to be matched is maintained. Each listed model feature is associated with an indicator which provides an indication as to whether the respective model feature is available for matching. A feature is marked as unavailable when it is matched. All features are marked as available upon the acquisition of a new frame.

Determining when to advance to a next frame may be based on, for example, the number of unmatched model features, or the amount of time elapsed while iteratively registering features for a current frame.

In a particular embodiment of the present invention, a list of <feature, frame> pairs which have been matched is maintained.

In at least one embodiment, all frames of the sequence of frames are available.

In one embodiment, for each available frame in the sequence, features are extracted from the frame, and searching for a match employs feature-to-feature matching.

In another embodiment, searching for a match employs feature-to-image matching.

In one feature-to-image matching embodiment, each available frame in the sequence is preprocessed, and the number of image regions to search is restricted. Preprocessing may include identifying regions of at least one predetermined color, for example a skin color, such that restricting the number of image regions to search comprises searching only the identified regions.

Alternatively, preprocessing may include examining the local spatial-frequency content of the frame's image, and identifying regions in which to search based on the local spatial-frequency content.

All steps may be performed off-line.

A search window may be defined which specifies a range of frames from which a feature can be selected. The search window may include all available frames, or it may include a subset, such as five frames, including the most recently acquired frame.

In one embodiment, the feature associated with a lowest cost is selected.

Alternatively, any feature which is associated with a cost which is less than some threshold may be selected. For each unregistered feature of each available frame, a cost is determined of search operations required to find a match with at least a predetermined probability, until a feature is found which has an associated cost less than the threshold, and that feature is selected. If no feature is found which has an associated cost less than the threshold, then a feature with the lowest determined cost may be selected.

To select a feature, a list of features is maintained. A minimum cost, such as −1, is assigned to a feature which has an associated cost less than the predetermined threshold. The list is then ordered according to the determined cost, such that a feature with the lowest determined cost is listed at the top of the list.

After searching for a match of the selected feature and updating the model, the cost is recalculated only for features affected by the state update.

The threshold may be, for example, a predetermined threshold, or it may be an adaptive threshold.

An update window may be defined which specifies a range of frames for which the model state is updated. The update window may be centered around a frame in which the most recent matching occurred, or alternatively, may span several multiples of a dominant time constant, for example, between two and seven multiples.

In one embodiment of the present invention, all steps are performed on-line. The frames are provided by a source such as a video source, e.g., a video camera. A signal may be provided to the video source to acquire a next frame. Frames may be provided from the video source at a fixed rate, for example, 30 frames per second.

Upon the acquisition of a new frame from the source, a determination is made as to whether to use the new frame. If it is determined to use the new frame, a new state vector is added to a state sequence, and initialized based on a previous set of measurements.

In one embodiment, the sequence of frames is a video sequence, and features may be attributes of an object appearance.

However, the image in each frame is not necessarily a video or even a picture-based image. In one embodiment, for example, the sequence of frames is an audio sequence, and features may be elements of a speech signal. Thus, the "image" is an audio image.

In yet another embodiment, the sequence of frames is a sequence of genetic data, and features may be biological markers. Here, the "image" may be considered to be the genetic data.

In at least one embodiment, the cost function is based on the feature's basin of attraction, and may be further based on the complexity of searching at each basin of attraction.

Preferably, searching is performed in a region of high probability of a match. A search region may be based on a projected state probability distribution.

Searching is based on maximizing a comparison function.

Selecting and searching are preferably responsive to a propagated state probability distribution. The state probability distribution is preferably projected into feature space.

In at least one embodiment, selecting includes determining, for each unregistered feature, the number of search operations required to find a match with at least a predetermined probability, and selecting a feature requiring the least number of search operations.

Determining the number of search operations for a feature may include determining search regions within a feature space, where each region has an associated probability density. The number of required search operations is then computed based on the determined search regions.

Determining search regions may include finding search regions within the feature space such that each region's associated probability density exceeds a predetermined threshold. The probabilities associated with each of the found search regions are summed to form a total probability. While the total probability is less than a predetermined probability, the threshold is lowered and the steps of finding search regions and summing the probabilities are repeated.

Searching may include feature-to-feature matching, where the number of search operations is the number of target features located within each search region. The number of target features located within the search region may be based on Mahalanobis distances to potential target features.

Target features may be approximately uniformly distributed, and the number of features may be proportional to the search region's size. The features are then ranked according to the sizes of the associated search regions.

Searching may alternatively include feature-to-image matching, wherein computing the number of required search operations includes, for each search region, dividing the region into minimally-overlapping volumes having a same size and shape as a basin of attraction associated with the feature, and counting the number of such volumes required to cover the regions.

Counting volumes may be approximated by obtaining eigenvalues and eigenvectors to a covariance matrix associated with the feature search region, calculating a basin of attraction span for each eigenvector direction, and approximating the count responsive to the eigenvalues and the spans.

Model states may be updated according to a propagated state probability distribution. Furthermore, the propagation of the probability distribution may be based on successive registered features.

The state probability model may have a Gaussian distribution, and may be propagated using a Kalman filter update step.

In one embodiment, the step of repeating continues only until a predetermined level of certainty in an estimate of the model is achieved, such that some of the available features are not registered.

A training set of registration tasks may be provided, in which case, for each registration task, an optimal feature ordering is determined by performing the steps of selecting, searching, updating and repeating. Responsive to the optimal feature orderings, a fixed ordering is determined. Finally, the object model is registered in the image using the fixed ordering.

A system for tracking an object model in a sequence of frames includes a feature selection module which selects an unregistered feature of the object model and an available frame from the sequence, to minimize a cost function of a subsequent search, a search module which searches for a match of the selected model feature to the image to register the feature, and an update module which updates the model state for each available frame based on the match found by the search module.

An embodiment in which, at any given time, only one frame is available, frames being available in sequential order, further includes an acquisition module for acquiring sequence frames, and a process control module which signals the feature selection module to terminate, and which signals the acquisition module to make available a next frame.

In each feature matching cycle, the feature with the smallest matching ambiguity among all model features in all frames maintained in a video store is selected. This process is known as "spatiotemporal feature selection."

After registration of the selected feature, the matching ambiguities of unregistered features in neighboring past and future frames may be changed through smoothing dynamics and may have to be recomputed for the following feature selection cycle.

When computing the matching ambiguities for all features in each feature selection cycle is too costly, "threshold" and "invariance heuristics" are used to update matching ambiguities.

In one embodiment, the video store may contain only the frame corresponding to the current time instance. In this case, the framework used is based on iterated sequential feature selection. A process control module determines when the next frame should be acquired into the video store.

In a second embodiment, the video store may contain the entire video sequence. In this case, tracking is off-line and the spatiotemporal feature selection is performed across all video frames for maximum tracking efficiency. The state sequence update module computes the model states in all frames simultaneously, and also applies smoothing according to the dynamic model.

In a third embodiment, the video store contains a small number of previous frames and the current frame. Here, tracking is done online. The spatiotemporal feature selection spans only a subset of the entire video sequence at each feature matching cycle. The tradeoff is the reduced efficiency of tracking.

In addition, when directly matching features to images, efficiency can be further enhanced by using a preprocessing step which determines which portions of a video frame should be searched.

This application is related to U.S. application Ser. No. 09/466,975, filed Dec. 20, 1999, and Ser. No. 09/466,970 filed Dec. 20, 1999, the entire teachings of which are incorporated herein by reference.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 16 is a schematic diagram of a feature table employed by the embodiment of FIG. 15.

DETAILED DESCRIPTION OF THE INVENTION

The present invention comprises a new class of sequential feature registration methods for efficient model-to-image matching. This new class has four advantages over sequential registration methods known in the prior art.

First, features are selected dynamically at each stage of a multi-stage registration process so as to minimize the required number of search operations.

Second, feature selection is based on both propagated prior state probabilities and image or feature data. Thus all available information is taken into account when ordering features.

Third, the present invention applies to both feature-to-feature and feature-to-image matching problems.

Finally, the method is automatic and can produce different feature orders for different registration problems without the intervention of the user.

The problem of object registration has three main components: 1) an "object model" which describes a target to be located in an input image; 2) a "comparison function" that determines how well a specific instantiation of the object model matches the image data; and 3) a "search strategy" that specifies how to systematically identify occurrences of the object model in the image.

The object model can be further decomposed into two main components: 1) a set of "features," such as templates, edge features, corner features, etc., that describe the visual signature of the object; and 2) a vector of parameters, called the "model state," that encodes the configuration of the features in the image.

Figure 1A:
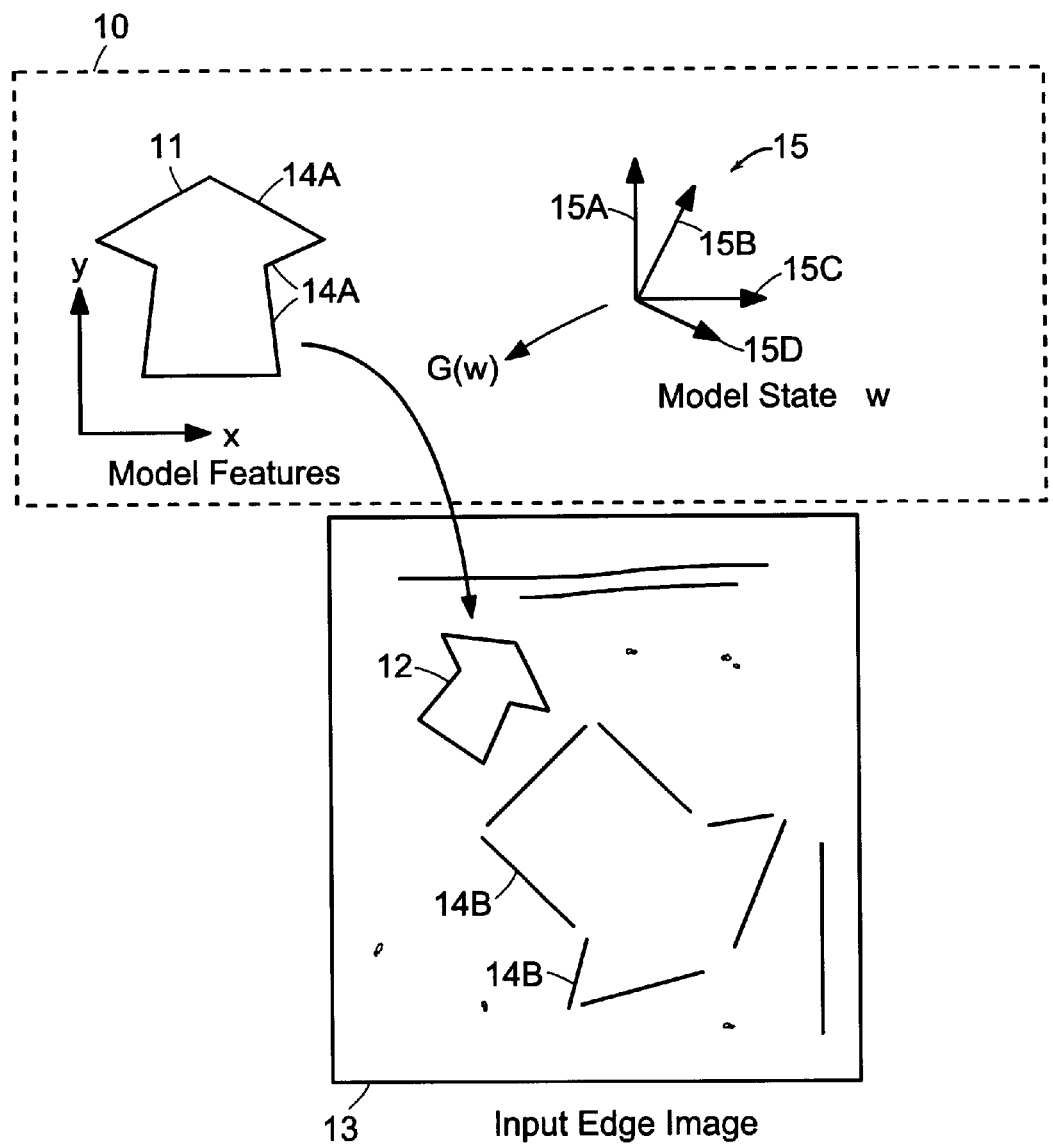
FIG. 1A is a schematic diagram illustrating the projection of a polygonal object model into an image by a transform.

Registration can be defined as the search for the model state that minimizes some cost function between the projection of the model features onto image or feature space, and the image itself FIG. 1A illustrates an exemplary object model 10 for the task of registering a known 2D polygonal shape in an image 13. The model parameters comprising the model state w 15 in this example encode four degrees of freedom: translation in x 15A and y 15B, rotation 15C, and scaling 15D. FIG. 1 illustrates the projection 12 of the object model features 11 into the image 13 by transform G(w) according to model state w 15. Model features define, for example, edges and corners in the input edge image.

In this example, edges are used as the registration features and the cost function measures the distance between projected model edges 14A and the extracted image edges 14B.

Figure 1B:
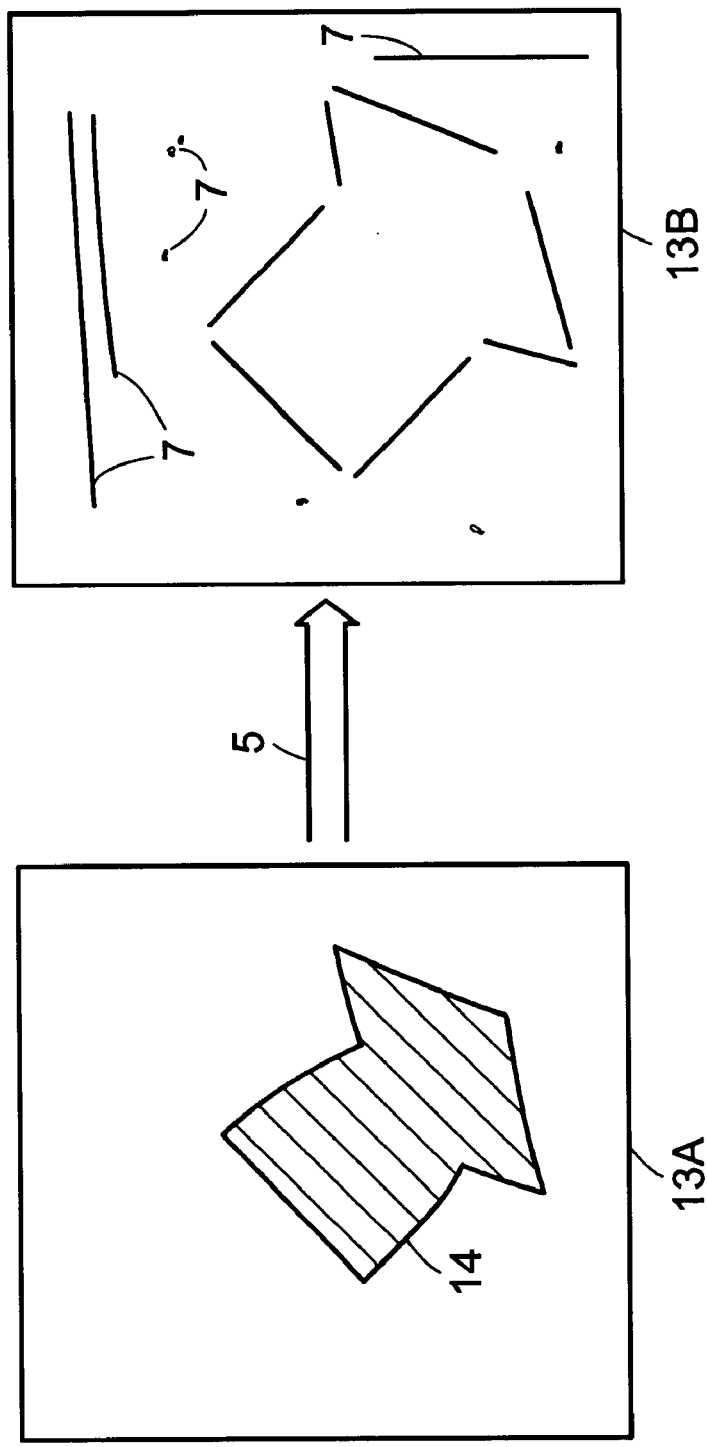
FIG. 1B is a schematic diagram illustrating edge extraction.

FIG. 1B illustrates an extracted edge image 13B resulting from the application of a standard edge detection algorithm 5 to an intensity image 13A containing the target object 14. The presence of spurious lines 7 and corners in the extracted edge image 13B or the input image 13A itself is a major source of difficulty in registration.

Figure 2A:
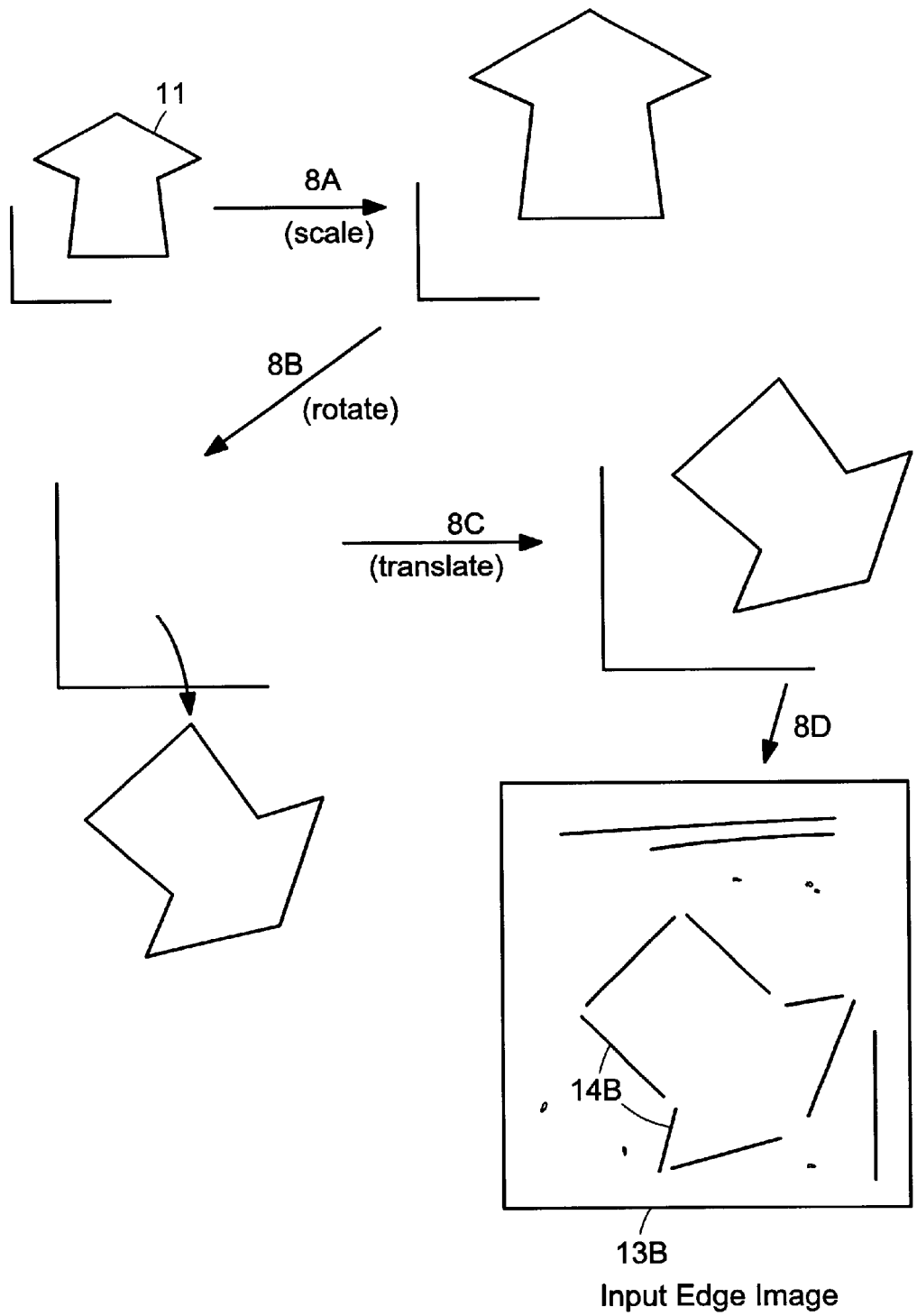
FIGS. 2A is a schematic diagram illustrating the transform of an object model into the image.
Figure 2B:
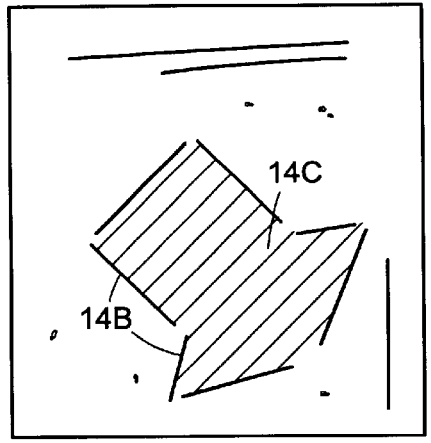
FIG. 2B is an illustration showing the result of successful registration.

FIGS. 2A and 2B show the desired result. FIG. 2A shows how, under the action of some optimal state w*, the polygonal model 11 is scaled 8A, rotated 8B and translated 8C such that it is aligned 8D with its corresponding image edges 14B.

FIG. 2B shows the result of successful registration. Optimal state w* has aligned the polygon model 14C (shaded) with its corresponding image edges 14B.

While the choice of object model and cost function depends greatly on the intended application, the search strategies used in a registration method are often quite general. Thus an improved search algorithm could have a significant impact on a broad range of applications.

The search can be performed either in state space or in feature space. The difficulty of the search problem depends to a large extent on the amount of prior information available about the state. Prior information in state space can be conveniently expressed as a probability distribution, which describes probabilities for the range of possible states.

For example, in a tracking application, the posterior state estimate from the previous frame can provide a strong constraint on the current state, i.e., a state prediction with a small variance. In this case, the state space volume that must be searched will be small, and the possible configurations of the object in the image will be tightly constrained.

Search strategies can update the state vector either sequentially or in parallel. Parallel updates modify all of the state parameters simultaneously to improve the quality of the match. The classical gradient descent algorithm is an example of parallel search. For registration problems with strong prior constraints, gradient-based optimization methods perform well, achieving quadratic convergence rates in many cases.

However, when prior information is weak or nonexistent, as in an object detection problem, sequential search strategies are often more efficient. Sequential search can take place in either state space or feature space. In this approach, subsets of state variables or features are processed in sequence, resulting in incremental updates of the state estimate. A chief advantage is that the search space becomes successively smaller, and the search problem easier, as more features or states are processed.

A classical example of sequential feature search is coarse-to-fine processing using an image pyramid. Starting at the coarsest level, the pyramid is processed sequentially, resulting in a series of state estimates of increasing accuracy.

In contrast to sequential feature search, sequential state space search has been employed in domains such as image mosaicing. For example, it is common in mosaicing to estimate the translation parameters before computing rotation and scale.

In most vision applications the model parameters interact strongly through the image features and it is not possible to optimize them independently when the prior information is weak. Thus the sequential state space method is primarily useful in domains such as mosaicing or visual tracking where there is a strong prior constraint. In contrast, sequential feature methods have much broader applicability. This suggests that an improved algorithm for sequential feature registration could impact many application domains.

1. Static Sequential Feature Registration

Figure 3:
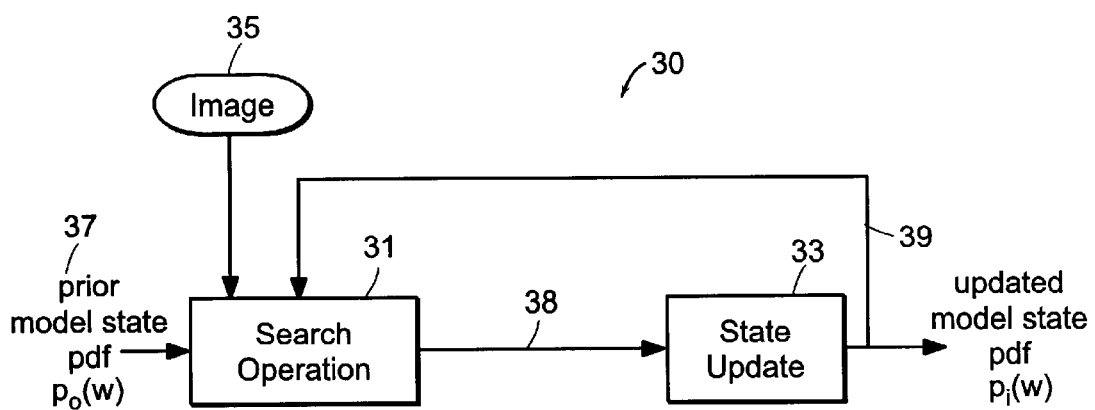
FIG. 3 is a block diagram illustrating static sequential feature registration as is well-known in the art.

The methods of sequential feature registration that are known in the prior art are based on a predetermined, fixed ordering of features. FIG. 3 is a block diagram illustrating the general process 30 for this registration method. In particular, FIG. 3 depicts the case where features are matched directly with the image, known as feature-to-image matching.

The process is iterative. It starts with an input image 35, an initial state distribution typically gleaned from prior knowledge, more commonly known in the art as a prior state distribution $p_0(w)$ 37, and a predefined sequence of features $\{F_i\}_{i=1}^n$. It ends when an acceptable state estimate 39 has been obtained. Processing steps for the ith iteration are as follows:

1. The search operation module 31 identifies the optimal position or configuration 38 for feature $F_i$. For example, in template registration using an image pyramid, $F_i$ would be the template model for the ith level of the pyramid. Under a translational state model, the search would begin at $x_i=n\ x_{i-1}$ and $y_i=n\ y_{i-1}$, where n is the sampling rate for the pyramid and $(x_{i-1}, y_{i-1})$ is the final state estimate from the previous level. Local exhaustive search could be used for a translational model, or gradient-based optimization if the model were more complex. The final state estimate for iteration i is chosen to minimize the cost function.

2. The state update module 33 uses the result 38 from the search operation module 31 to compute a new probability distribution 39 for the model state. Because an additional feature whose position or configuration has now been determined is now registered, the state probability distribution will be more sharply peaked, representing increased accuracy of the model parameters. In an exemplary implementation, a Gaussian model can be used for the probability distribution. The state update module 33 then involves a Kalman update step as described in Anderson et al., "Optimal Filtering," Prentice-Hall, 1979, incorporated by reference herein, in which the mean and covariance of the state are computed.

3. Steps 1 and 2 are repeated for each feature in the pre-ordered sequence. The search operation module 31 uses the updated probability distribution 39 from the state update module 33, until the process converges or achieves the desired accuracy.

In some cases, searching is more efficiently carried out by matching the model features directly to features extracted from the image (image features). The features applicable for this form of matching are typically discrete features such as corners, edges and contours. In these instances, the feature extraction is done as an independent process whereby the relevant feature-detector is applied on the image. For example if edge, corner or contour features are to be matched, corresponding edge detectors, corner detectors or B-spline fitting algorithms are used for feature extraction.

Edge detectors are described in Canny, "A computational approach to edge detection," IEEE Trans. Pattern Analysis and Machine Intelligence, vol 8, pages 679–698, 1986. Corner detectors are described in Noble, "Finding corners," Image and Vision Computing, 6(2), pages 121–128, 1988. B-spline feature extraction is described in Cham et al., "Automated B-spline curve representation incorporating MDL and error-minimizing control point insertion strategies," IEEE Trans. Pattern Analysis and Machine Intelligence, 21(1), 1999.

Prior methods for static sequential feature registration have employed a variety of fixed, heuristic feature-ordering schemes. One of the most popular schemes is simply to order the features a priori based on feature size. For example, in one prior method the components of an object (e.g. a cabinet) are sequentially registered based on a pre-determined hierarchical decomposition (e.g. progressing from the overall cabinet frame to the cabinet drawers). See Hauck et al., "Hierarchical recognition of articulated objects from single perspective views," Proceedings Computer Vision and Pattern Recognition, pages 870–876, San Juan, PR, 1997.

Another class of prior methods for size-based feature-ordering is multi-resolution search. The search begins at the lowest image resolution level and hence the coarsest features which survive at this resolution are used first. While the low resolution reduces the amount of search required to find the correspondences, the accuracy of estimation is poor. However once an approximate model state is computed, the search progresses to the next resolution level. At this level smaller features are used. Because an estimate of the model state is known, the search can be confined to smaller regions of the image where these features are expected to be found. The state estimate after incorporating the smaller features becomes more accurate, and thus this routine progresses through the other levels with heuristically minimal search. A method which uses a multi-resolution approach for registration is described in Cham et al., "A statistical framework for long-range feature matching in uncalibrated image mosaicing," Proc. IEEE Conference on Computer Vision and Pattern Recognition, pages 442–447, Santa Barbara, Calif., 1998.

In another prior method, the search for a small object is directed by its known probability of being located in a vicinity of larger objects (e.g., a spoon on table). Hence search is done indirectly by first looking for the large object followed by the desired smaller object. See Wixson et al., "Using intermediate objects to improve the efficiency of visual search," Int. Journal of Computer Vision, 12(2/3), pages 209–230, 1994.

As an alternative to feature size, other prior methods use the a priori robustness of features to order their selection during tracking. See Toyama et al. in "Incremental focus of attention for robust visual tracking," Proceedings Computer Vision and Pattern Recognition, pages 189–195, San Francisco, Calif., 1996. A face-tracking system based on this method uses a fixed hierarchy of tracking methods. At the start, tracking is carried out using the coarsest but most robust method, e.g., skin-color sensor. If the sensor output is deemed to be stable, higher-level methods are used which increase both estimation accuracy and computational cost, e.g., template feature matching. Failure of higher-level methods return the tracker to lower-level methods.

In related prior art by Coutaz et al. a finite state machine is used to determine which feature detectors to apply during visual tracking. See Coutaz et al., "Coordination of perceptual processes for computer mediated communication," Proceedings of 2nd Int. Conference Automatic Face and Gesture Recognition, pages 106–111, 1996. The processes are selected according to an overall confidence measure in tracking obtained from the previous image frame. As in the prior method of Toyama et al. the hierarchy of processes is fixed and manually specified. The difference in these two prior methods is that the finite state machine allows some levels to be bypassed based on a confidence measure.

Another prior art proposes a fixed feature ordering strategy for registering articulated objects which can be described by kinematic chains. See Hel-Or et al., "Constraint fusion for recognition and localization of articulated objects," Int. Journal of Computer Vision, 19(1), pages 5–28, 1996. In this method, features along a kinematic chain are successively matched in linear order from end to end. A linear Gaussian estimation method is used to incrementally improving the model state and covariance estimates.

Another prior method addresses the question of using a predefined subset of the total features in order to achieve a prespecified accuracy. See Akra et al., "Sampling of images for efficient model-based vision," IEEE Trans. Pattern Analysis and Machine Intelligence, 21(1), pages 4–11, 1999. This method addresses image sub-sampling for efficient registration. This is an example of the statistical problem of optimal stopping.

In all the above cases, the ordering of the features are manually fixed prior to the registration process. For example in registering a human kinematic model using template features, the ordering of features may be pre-specified as {torso_face_hair upper-arm_lower-arm_. . . }. However, having a fixed feature ordering is sub-optimal for two reasons.

First, prior knowledge of the model state is ignored. For example, in tracking problems, a common occurrence is partial tracking failure. A person tracker may mistrack various limbs due to distractors such as shadows, background clutter and occlusion, yet accurately track other parts of the body. Consider the situation in which a person's lower leg is accurately tracked, but tracking has failed on the rest of the body. The reinitialization process should be able to exploit the accurate localization of the lower leg in registering the rest of the body. This is achieved by a feature order which starts at the lower leg, as described below in Section 3. This clearly demonstrates the need for dynamic feature ordering, since failure modes cannot be predicted in advance.

Second, image data is ignored. Consider a different example in which a computer has an attached camera and is running a vision-based head-detection system as part of an advanced user interface. The system has two low-level sensors for independently detecting skin-color and motion. A person's head can be further localized by using two high-level features: (i) a face feature or (ii) a head-silhouette feature. These features can be detected with significant computational cost, using either a face-detection algorithm which analyzes image regions containing skin-color pixels, or a head-silhouette analysis algorithm which operates on image regions containing motion.

If the computer were used in a room with skin-colored walls, the skin-color sensor would output large candidate image regions, while the motion sensor would produce only a small candidate region. In this case, the person's head would be more efficiently localized using the head-silhouette analysis algorithm first before the face-detector.

Conversely, if the location was a factory floor with moving machinery, there would be large candidate regions for the motion-sensor but a small candidate region for the skin-color sensor. Here it would be more efficient to use the face-detector first. As demonstrated in these examples, the most efficient feature ordering is dependent on the image data and cannot be predicted in advance.

Figure 4A:
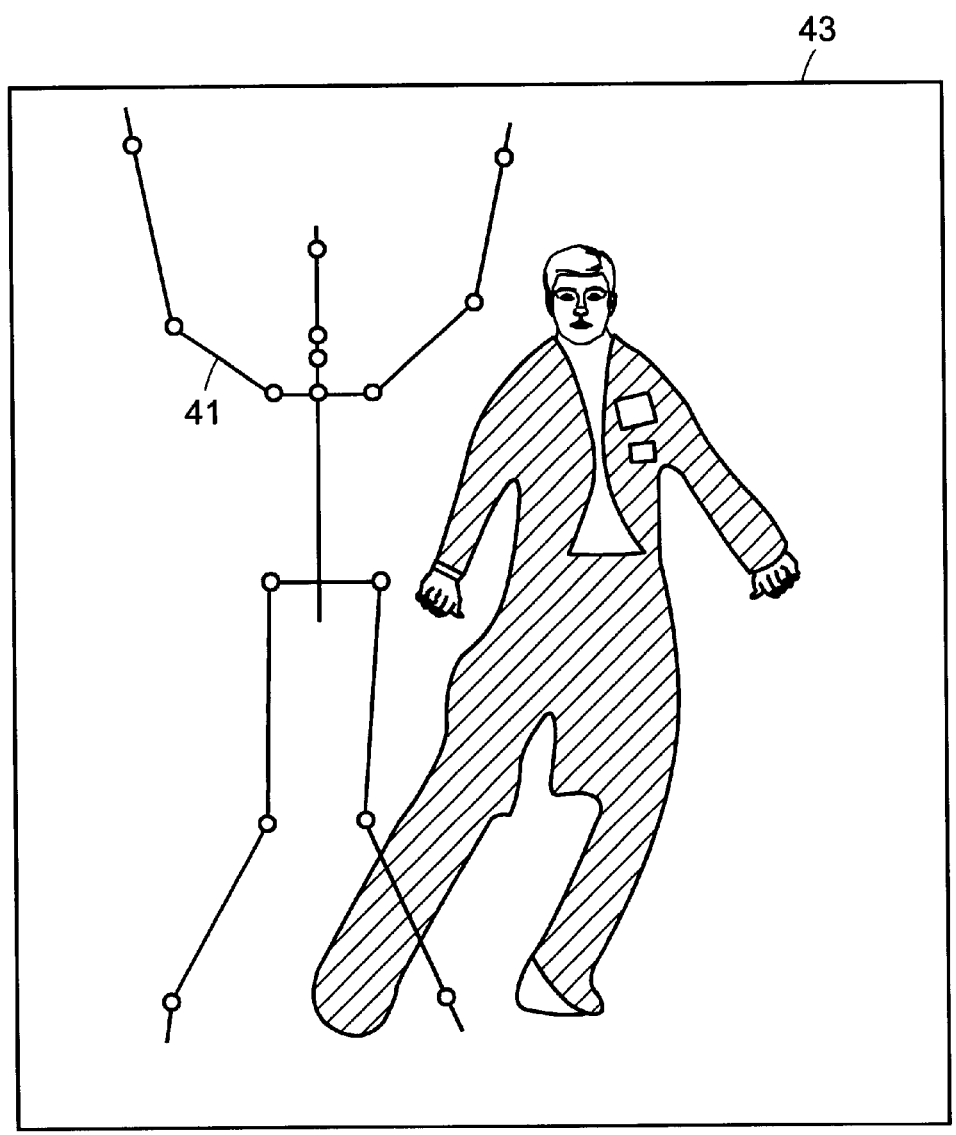
FIGS. 4A and 4B are diagrams illustrating the registering of a kinematic model with known features.
Figure 4B:
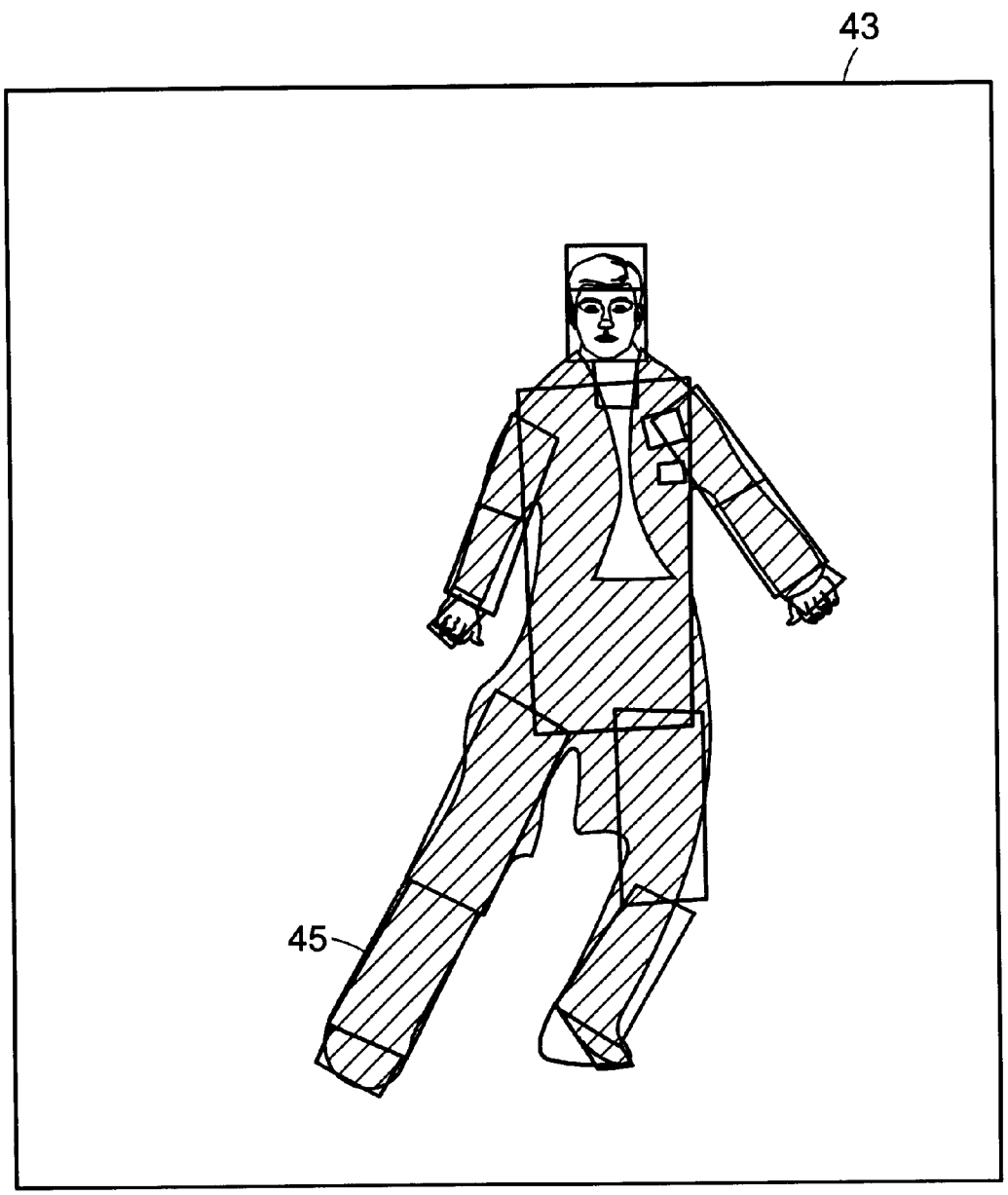

Experimental evidence underscores the importance of selecting the optimal feature ordering for a registration problem. Consider an exemplary task of registering a human kinematic model in an image FIGS. 4A and 4B illustrate the registering of a high-degree of freedom (DOF) kinematic model with known features, but without prior knowledge of the model state, using a template-based feature model known in the art as a scaled prismatic model (SPM). FIG. 4A shows the initial model state of the model 41 compared to the image 43, while FIG. 4B shows the desired feature registration 45. If the model is highly detailed and if the initial feature used was a hand template feature, the search process would take much longer than if the initial feature was the torso template feature.

Figure 5:
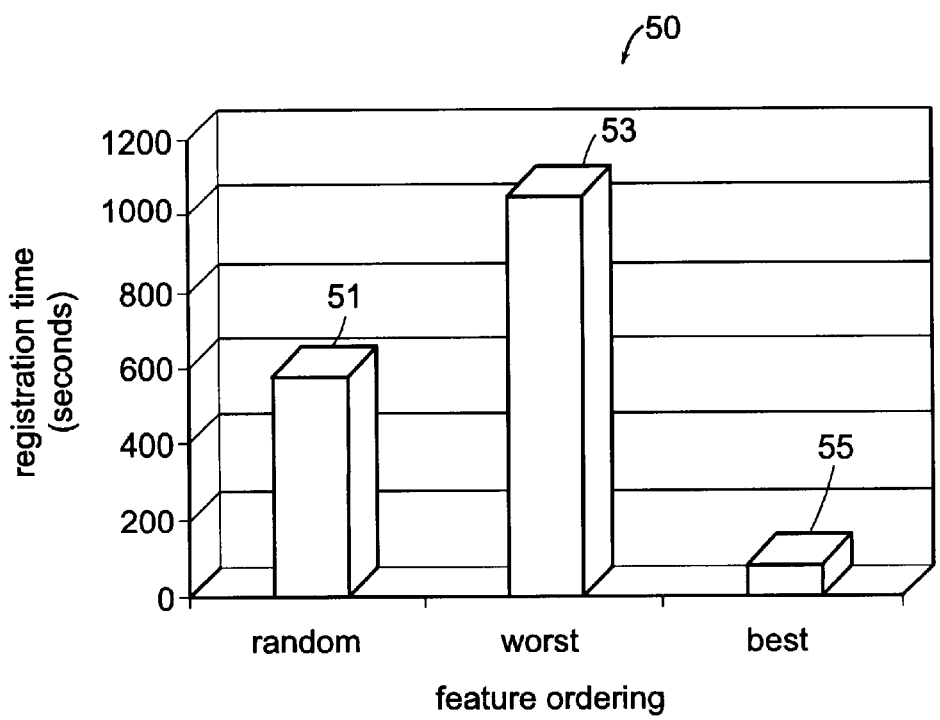
FIG. 5 is a graph illustrating sequential feature registration times with different feature ordering.

FIG. 5 is a graph 50 which illustrates this problem by comparing the amount of time required in Applicants' experiments to register the model using: (a) random ordering of features 51, (b) worst ordering 53, i.e., ordering of features which take the longest registration time, and (c) best ordering of features 55.

The results show that the sequential feature registration time is very sensitive to the ordering of features used. In particular, Applicants are able to achieve a speedup of 24 using an optimal ordering compared to the worst ordering. Hence, when designing an algorithm for sequential feature registration, finding an efficient ordering of the features is critical.

2. Dynamic Sequential Feature Registration

Figure 6:
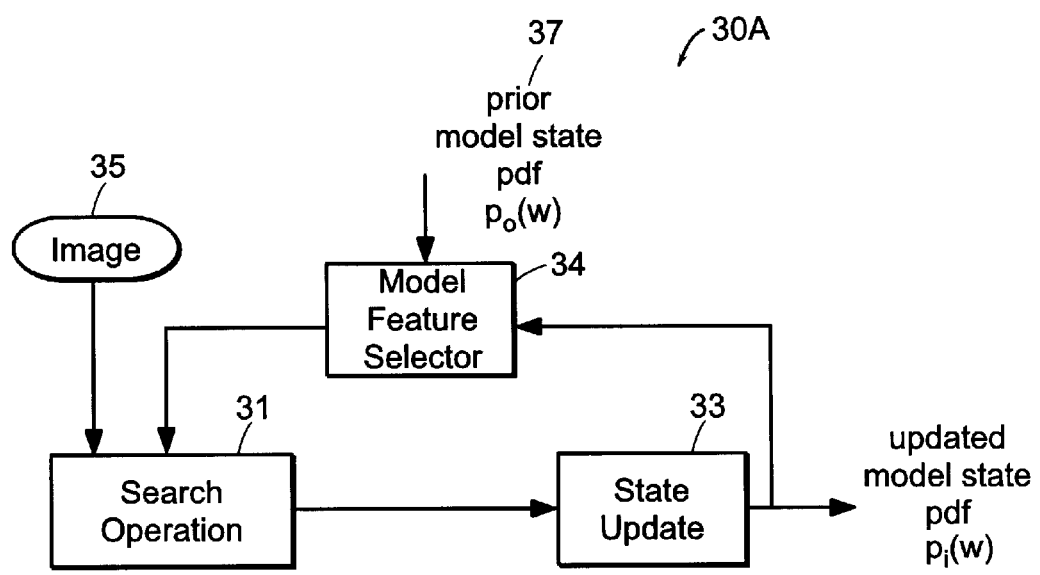
FIG. 6 is a block diagram of a feature-to-image matching embodiment of the present invention.

FIG. 6 is a block diagram of a feature-to-image matching embodiment 30A of the present invention. The sub-optimality of fixed feature ordering is avoided by adding a model feature selector module 34 in the sequential feature registration process 30A. The model feature selector module 34 analyzes the remaining unmatched model features to determine which feature to search next.

In this manner, the feature ordering is determined dynamically during the registration process. Both prior knowledge and the image data are allowed to influence the feature ordering.

Figure 7:
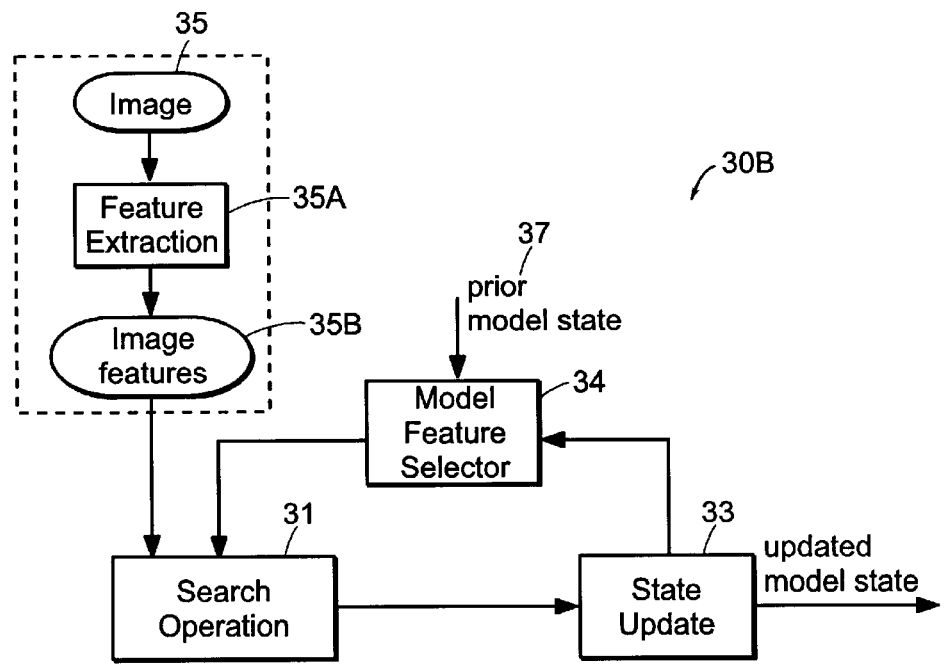
FIG. 7 is a block diagram of a feature-to-feature matching embodiment of the present invention.

FIG. 7 is a block diagram 30B for a feature-to-feature matching embodiment. Here, the image 35 is replaced by a set of image features 35B created by a feature extractor 35A which extracts features from the image 35.

In the next two sections, 2.1 and 2.2, some mathematical notation is established for this framework, and formally describe feature-matching. Section 2.3 explains how the amount of search operations required to match each feature, called the "matching ambiguity," can be determined. Section 2.4 describes the feature-selection module 34 of FIGS. 6 and 7, which orders features dynamically during the matching process. Other components of search initialization, registration and state-update are then discussed.

2.1 Spatial Registration Framework

The spatial registration framework is expressed as follows. Start with an object model M comprising a set of known "source" features F and a set of transformation functions $\{G_1, G_2, \ldots\}$, each of which maps an associated feature into the image. This is described in more detail below. Then, given a target image I, the goal is to match these features to their correct locations in the image and to recover the parameters of M denoted as a vector w. These features can either be prior knowledge as part of the model specification, or in the case of registering two images, they can represent extracted features.

The amount of searching required in the registration process depends significantly on the a priori knowledge of the model parameters. For example, if w has a small prior covariance, such as in video-based tracking applications, feature-to-feature matching may simply involve mapping the source features into the image and searching for the nearest target features. The model parameters may then be computed directly from these correspondences. Similarly, if template features are used instead, registration may be carried out in the model state-space by locally minimizing the pixel residual error. Registration in these problems which have strong priors do not have significant search complexities and all features can be matched simultaneously.

In the case of registering a kinematic model of the figure to an image, F may be the set of template features associated with the links in the model, and M is parameterized by a vector of joint angles and link lengths. These features are not necessarily limited to a single class, as F can simultaneously include templates, corners and edges. It can also include features from different levels of resolution.

2.2 Analysis of Spatial Features

A feature $f \in F$ is described by a number of attributes:

1. A function $G_i: w \_ u$ which maps the model state w to a feature state u for feature $f_i$ in a common feature space. This feature space is common to all features of the same type. For example, if the feature is a point, the common feature space is simply the image space. For more complex features such as templates or edges, the feature space may be further parameterized by including additional rotation, scaling or skew dimensions if necessary.

2. A property vector p which allows a feature to be compared with another feature, or compared to the image, using a comparison function. Examples of such properties are color, shape, etc.

3. Additionally for image-based features such as templates, we specify the dimensions for a "basin of attraction" in feature space. A basin of attraction for a particular feature is a region bounded by the maximum displacement or perturbation between the true and predicted locations of the feature in feature space for which local optimization of the estimated location (via the maximization of a comparison function) guarantees convergence toward the true location.

In the case of feature-to-feature matching, a feature comparison function $C_{ff}(p_i,p_j)$ generates a similarity measure for comparing feature pairs. In the case of feature to image matching, the comparison function $C_{fi}(p_i,u_i,I)$ measures the compatibility between the feature in its current feature state pi with the image I—it is through the maximization of this function by which the image-based features can be optimally localized.

Finally, we assume that the correct feature pair or feature state maximizes the relevant comparison functions, i.e., once all candidate features or states are tested, the correct solution will be obtained.

2.3 Matching Ambiguity of a Feature

In order to compute the cost of matching a particular feature, we introduce the concept of "matching ambiguity." The matching ambiguity of a feature $f_i$, denoted by $\alpha_i$, is defined as the number of search operations required to find the true match with some specified minimum probability.

Computation of the matching ambiguity for a particular feature can be done in the following way. Starting with the probability distribution of the model state and some specified minimum probability $\rho$ for finding the true match of the feature:

1. Find the regions in the feature space within which the probability density exceeds some threshold.
2. If the total probability within these regions is less than $\rho$, lower the threshold and return to step 1.
3. Compute the number of search operations required to find the match within these regions. For feature-to-feature matching, this is done by counting the number of candidate target features located within the regions. For feature-to-image matching, the regions are divided into volumes which are the same size and shape as the basin-of-attraction of the feature. The number of such volumes required to fully cover the regions is then counted.

The number of search operations computed in step 3 is the matching ambiguity.

To illustrate this process, consider an exemplary implementation which assumes that the probability of the model state is based on a Gaussian distribution. We can employ the idea of a search region such as the "validation gate" used in extended Kalman filters and described in Bar-Shalom et al., "Tracking and Data Association," Academic Press, 1988, incorporated by reference herein, to compute the matching ambiguity. This is shown below.

Assume that the estimated model state has a mean $\mu$ and a covariance $\Sigma$. Linearizing the mapping $G_i(w)$ about $\mu$, the covariance $S_i$ in feature space is expressed as $$S_i = J_i \Sigma J_i^T \quad (1)$$

where $$J_i = \nabla G_i|_{w=\mu} \quad (2)$$

is the Jacobian. The validation gate is then the volume bounded by an isoprobability surface which may be specified as a factor $\psi$ of standard deviations.

For feature-to-feature matching, the matching ambiguity is then the number of target features which lie within the validation gate. This may be obtained by evaluating the Mahalanobis distances to potential target features and counting. Unfortunately, this is a potentially intensive computation because it would involve pair-wise comparisons of features. A reasonable approximation which can be used when target features are approximately uniformly distributed is that the matching ambiguity is proportional to the size of the validation gate, i.e.

$$\alpha_i \propto (\|S_i\|)^{1/2} \quad (3)$$

Since in the algorithm proposed later the matching ambiguities are used to sort the features, the exact values of the matching ambiguities need not be evaluated as long as they can be ranked in the right order.

For feature-to-image matching, the matching ambiguity is the number of minimally-overlapping regions which have the same dimensions as the basin of attraction that would fit into the validation gate. This can be approximated by first obtaining the eigenvalues $e_j$ and eigenvectors $v_j$ to the covariance matrix $S_i$, and then calculating the span of the basin of attraction $b_j$ along each of the $v_j$ directions. Finally, the matching ambiguity is computed as $$\alpha_i \approx \prod_j \text{ceil}\left(\psi \frac{\sqrt{e_j}}{b_j}\right) \quad (4)$$

where ceil(.) rounds fractional values up to the next integer.

Matching ambiguity can also be based on further complexity in the search process.

Figures 8A, 8B:
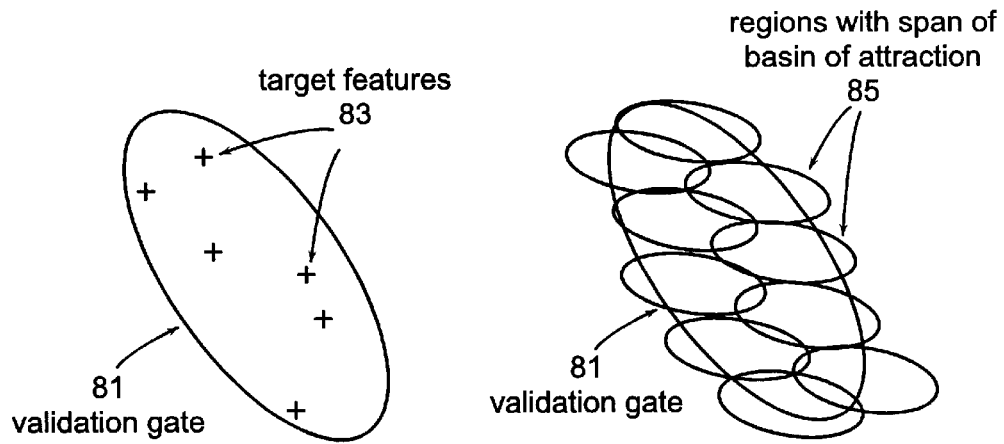
FIGS. 8A and 8B are conceptual diagrams illustrating matching ambiguity for feature-to-feature matching and feature-to-image matching, respectively.

FIGS. 8A and 8B illustrate the concept of matching ambiguity for the two separate cases in this exemplary implementation. Because a Gaussian probability model is assumed here, the validation gate 81 is elliptical.

FIG. 8A shows, for feature-to-feature matching, the target features 83 located within the validation gate 81 of a source feature. The matching ambiguity in this case is the number of candidates to be searched, which here is six. The regions having the same span of the basin of attraction indicated in FIG. 8B are referred to as "attractor regions" 85.

FIG. 8B shows, for feature-to-image matching, minimally overlapping regions 85 with the span of the basin of attraction covering the validation gate 81. The matching ambiguity is the number of regions required, which here is ten.

2.4 Dynamic Feature Ordering and Selection

As each feature is used in the estimation step during sequential search, the model state probability distribution becomes more sharply peaked, reflecting the increased accuracy in the model parameters. This means that as each feature is used in the registration process, the high probability regions in feature space become smaller for the remaining unmatched features, thereby leading to a reduction in their matching ambiguities.

If the intention is to use all available features in the registration process, then the total number of search operations involved can be minimized by selecting each successive feature to be the feature requiring the smallest number of search operations to be matched, among all remaining features. This ordering of features can only be done at run-time, hence the term "dynamic feature ordering" is used.

Based on this principle of search minimization, an efficient feature selection method is described below which is to be used in the feature selector module 34 of FIG. 6.

Figure 9:
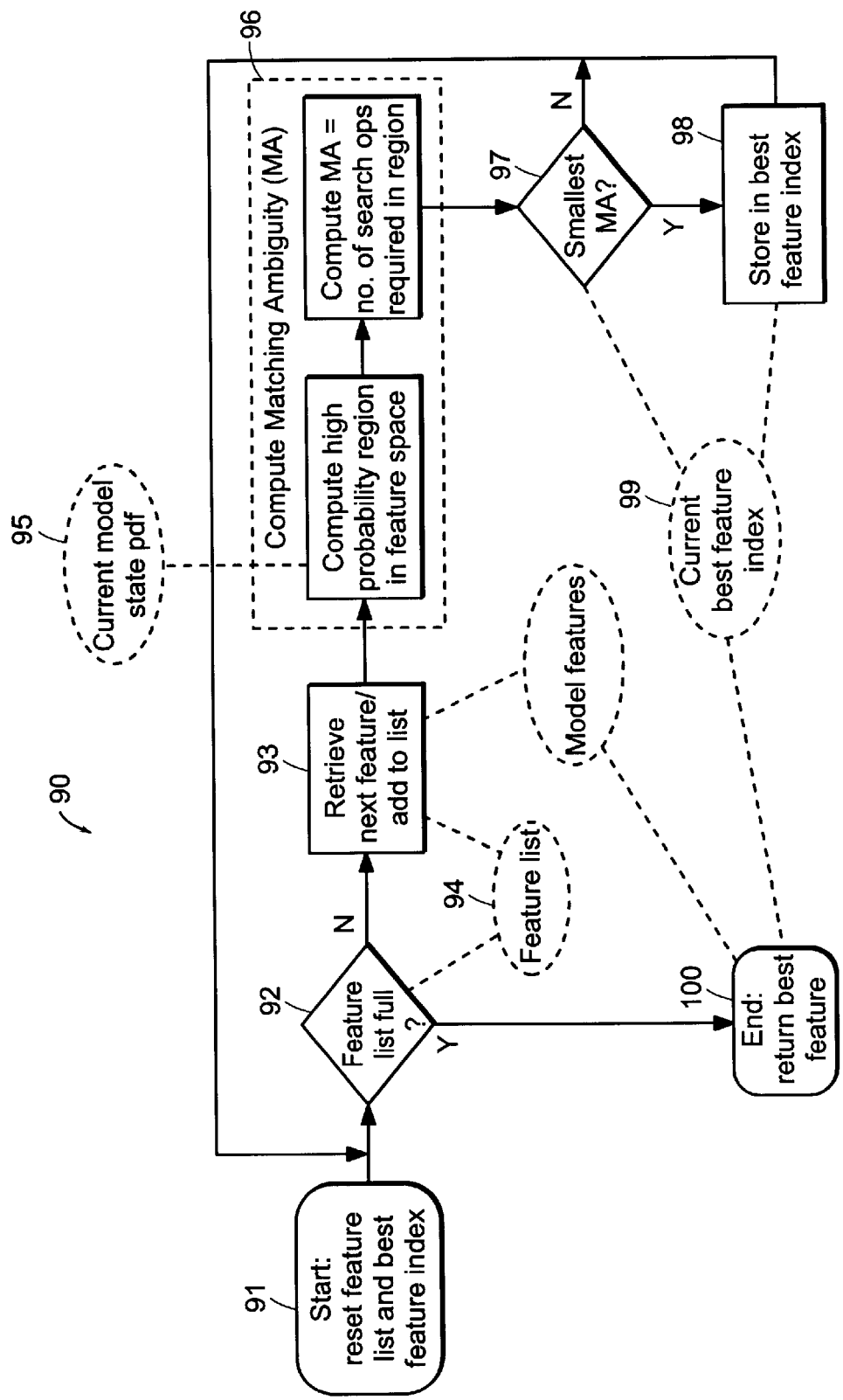
FIG. 9 is a flow diagram for the feature selection module of FIGS. 6 and 7.

FIG. 9 is a flow-chart 90 for this feature selection method.

1. Set the list of used features L as empty, and initialize the "best" feature index. That is, set (database index $i_b$, matching ambiguity $\alpha_b$) to $(-1, \infty)$. (Step 91)
2. Check if L is full, i.e. if it contains all features in the model feature database. Go to step 8 if full. (Step 92)
3. Retrieve the next model feature $f_i$ in the database 94, and add $f_i$ to L. (Step 93)
4. Based on the current model state probability distribution 95, compute, in a matching ambiguity calculator, the matching ambiguity $\alpha_i$ for the feature, using the method described previously in section 2.3. (Step 96)
5. If $\alpha_i > \alpha_b$, return to step 2 (Step 92). (Step 97)
6. Otherwise feature $f_i$ is currently the "best" feature with the smallest matching ambiguity. Update the best feature index 99: $(i_b, \alpha_b) = (i, \alpha_i)$. (Step 98)
7. Return to step 2 (Step 92).
8. The feature with the smallest matching ambiguity has been found. Extract feature with index $i_b$ from the database and pass to the next module in the system (i.e. the search initialization module). (Step 100)

2.5 Search Initialization and Registration

Once the feature selection has been carried out, the search initialization and registration processes for matching a feature is straightforward. Once again this is different for matching to features or directly to the image:

1. For feature-to-feature matching, each image feature which is found within the desired high probability regions in feature space represents a target for the matching the model feature. Registration then involves mapping the model feature to each image feature, and selecting the mapping to the image feature which maximizes the feature-to-feature comparison function $C_{ff}$.
2. For feature-to-image matching, the method of computing the matching ambiguity involves dividing the high probability regions into volumes which are the size and shape as the basin-of-attraction. Hence the initial search points, or "seeds," in the matching process are simply the center points of each basin-of-attraction. Registration then involves mapping the model feature to each of the seeds, locally maximizing the comparison function $C_{fi}$ within the basin-of-attraction, and selecting the optimal mapping of model feature to image.

2.6 State Update

State update involves computing the new probability distribution of the model parameters based on matching the previous feature. State update may be achieved using different methods depending on the probability representation used. For example, probability representations using histogramming, Parzens window, mixture-of-Gaussians, or particle distributions have well-documented methods of updating the probabilities based on additional observations. Parzens window is described in Therrien, "Decision, Estimation and Classification: An Introduction to Pattern Recognition and Related Topics," John Wiley, 1989. Mixture-of-Gaussians is described in Bar-Shalom et al., "Tracking and Data Association," Academic Press, 1988. For particle distributions, see Isard et al., "CONDENSATION—conditional density propagation for visual tracking," Int. Journal of Computer Vision, 29(1), pages 5–28, 1998.

The simple example shown here is based on the Gaussian model which is parameterized by a mean and covariance. This employs the Kalman filter update step. The updated model mean state $\mu_k$ and covariance $\Sigma_k$ can be computed from the optimally registered feature state $\mu_b$ with observation covariance $S_b$ via the following equations:

$$\mu_k = \mu_{k-1} + K_k (u_b - J_k u_{k-1}) \quad (5)$$

$$\Sigma_k = \Sigma_{k-1} - K_k J_k \Sigma_{k-1} \quad (6)$$

where the subscript k denote the sequential update index and $K_k$ is the Kalman gain given by $$K_k = \Sigma_{k-1} J^T (J \Sigma_{k-1} J^T + S_b)^{-1} \quad (7)$$

Combining all the components discussed in the previous sections, we arrive at a sequential registration method employing the novel feature selection mechanism based on dynamic feature ordering.

Again using an exemplary implementation where a Gaussian probability distribution model is assumed, the complete algorithm is illustrated below:

1. Set the hierarchy list of used features $L_H$ as empty.
2. Compute the matching ambiguities $\alpha_i$ for all unused features, using either equations (3) or (4).
3. Select the feature $f_b$ for which $\alpha_b$ is the smallest matching ambiguity. Note that this step and step 2 above are described in more detail with respect to FIG. 6.
4. Carry out the necessary $\alpha_b$ search operations to recover the optimal feature state $u_b$. This is the minimum number of search operations which have to be performed to register a feature.
5. The optimal feature state $u_b$ and the associated observation covariance $S_b$ are used to improve the model state and covariance by applying the standard Kalman filter update steps (5) and (6).
6. Append $f_b$ to the $L_H$.
7. If all features have been used, stop; otherwise return to step 2.

At the end of the registration process, the hierarchy list of features $L_H$ contains the "feature hierarchy." The feature hierarchy represents the optimal sequential ordering of features and is dependent on the prior model state and covariance, as well as the accuracy of registering each feature. The feature hierarchy must be formed dynamically as part of the estimation process. While the predefined feature orderings used in the algorithms may be reasonably efficient in typical situations, the optimal feature hierarchy can often be found at negligible cost using the 2DYFOR algorithm. Furthermore, the dynamic feature ordering copes even when the prior knowledge changes significantly—using the original predefined feature ordering may not take full advantage of the additional prior knowledge for increasing search efficiency.

3 Experimental Results

An exemplary use of this algorithm is in figure registration. Here we attempt to register a 2D Scaled-Prismatic Model (SPM) to a person in a test image, based on known template features. The SPM model is further described in Morris et al., "Singularity analysis for articulated object tracking", Proc. IEEE Conference Computer Vision and Pattern Recognition, pages 289–296, Santa Barbara, Calif., 1998. A Gaussian probability representation is also used here.

Figure 10A:
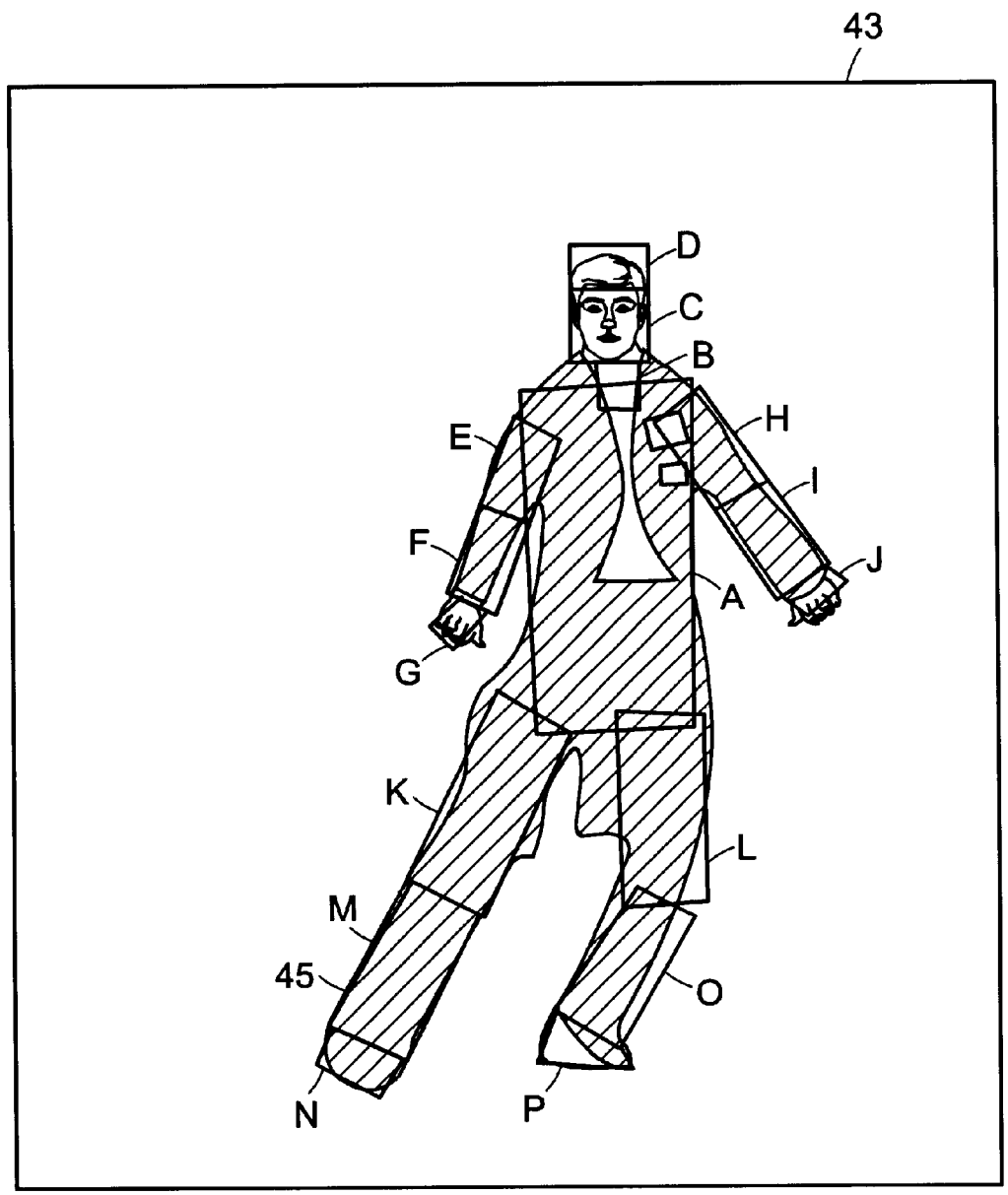
FIG. 10A is a diagram illustrating the dynamic feature ordering, by an embodiment of the present invention, for the image of FIGS. 4A and 4B FIGS. 10B and 10C are diagrams illustrating, respectively, an initial state and a dynamic feature ordering for another image.
Figure 10B:
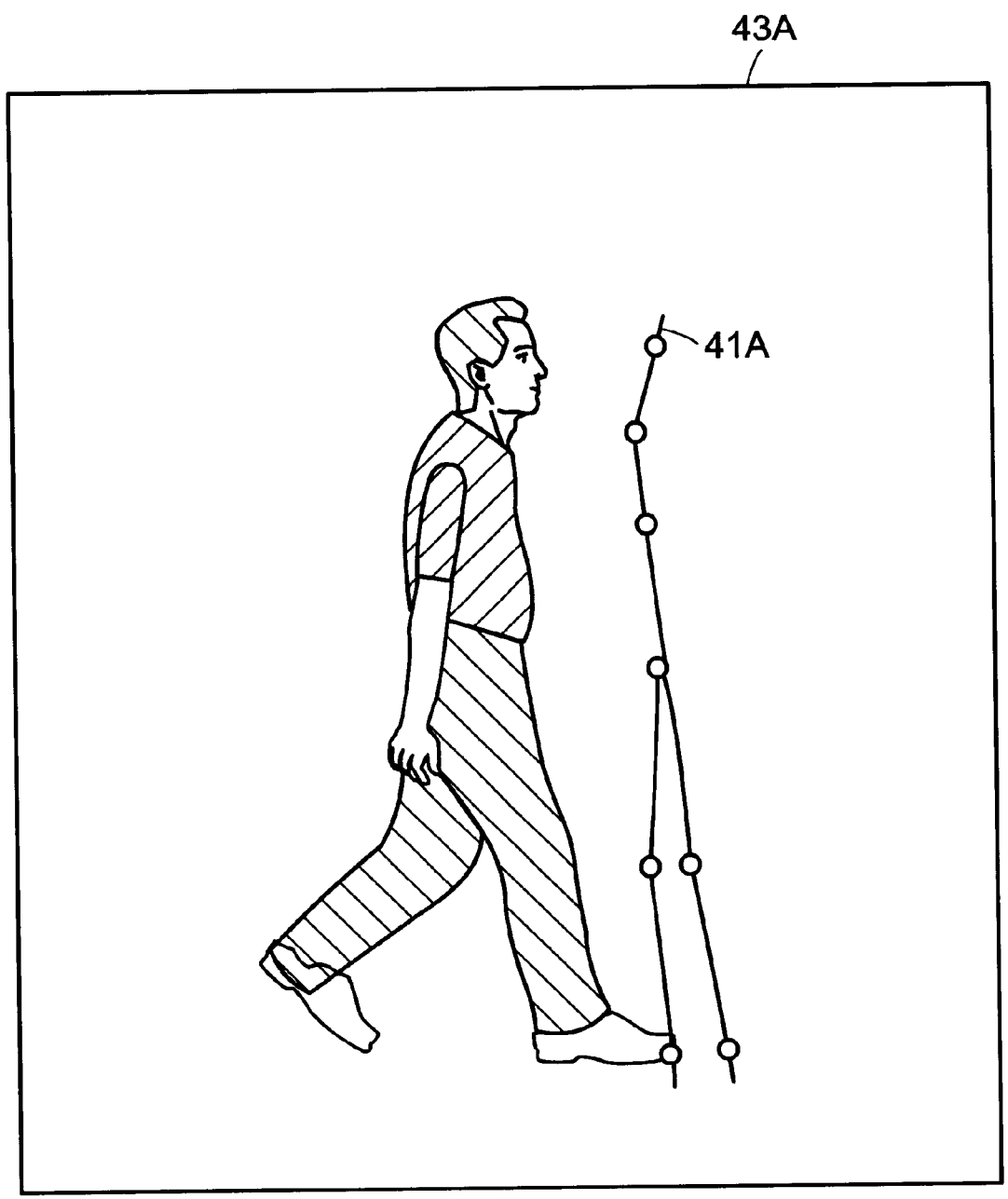

In our experiments which involve localizing the figure with minimal prior knowledge, the model state is initialized as denoted by the pose of the stick figure in the images of FIGS. 4A and 10B. The prior covariance is set as a diagonal matrix with standard deviations of 50 pixels for global x translation, 20 pixels for global y translation, 2 radians for joint angles and 10 pixels for link lengths. The only strong prior is that the torso is approximately upright as we wish to restrict our search to upright figures. For each template, the basin of attraction for the refinement step is set to be its minimum dimension at present, although a more formal analysis may be applied in the future based on the spatial frequency content of the templates.

FIG. 10A illustrates the feature ordering that arises in the registration process for the image of FIGS. 4A and 4B. The ordering is indicated alphabetically, "A" indicating the first ordered feature, "B" the second, and so on. The feature ordering obtained in these instances is similar to a size-based ordering, except that in the algorithm employed by the preferred embodiment of the present invention, the ordering is done both automatically and dynamically. The registration localizes the figure well despite the high dimensionality of the figure model and the weak prior knowledge.

Figure 10C:
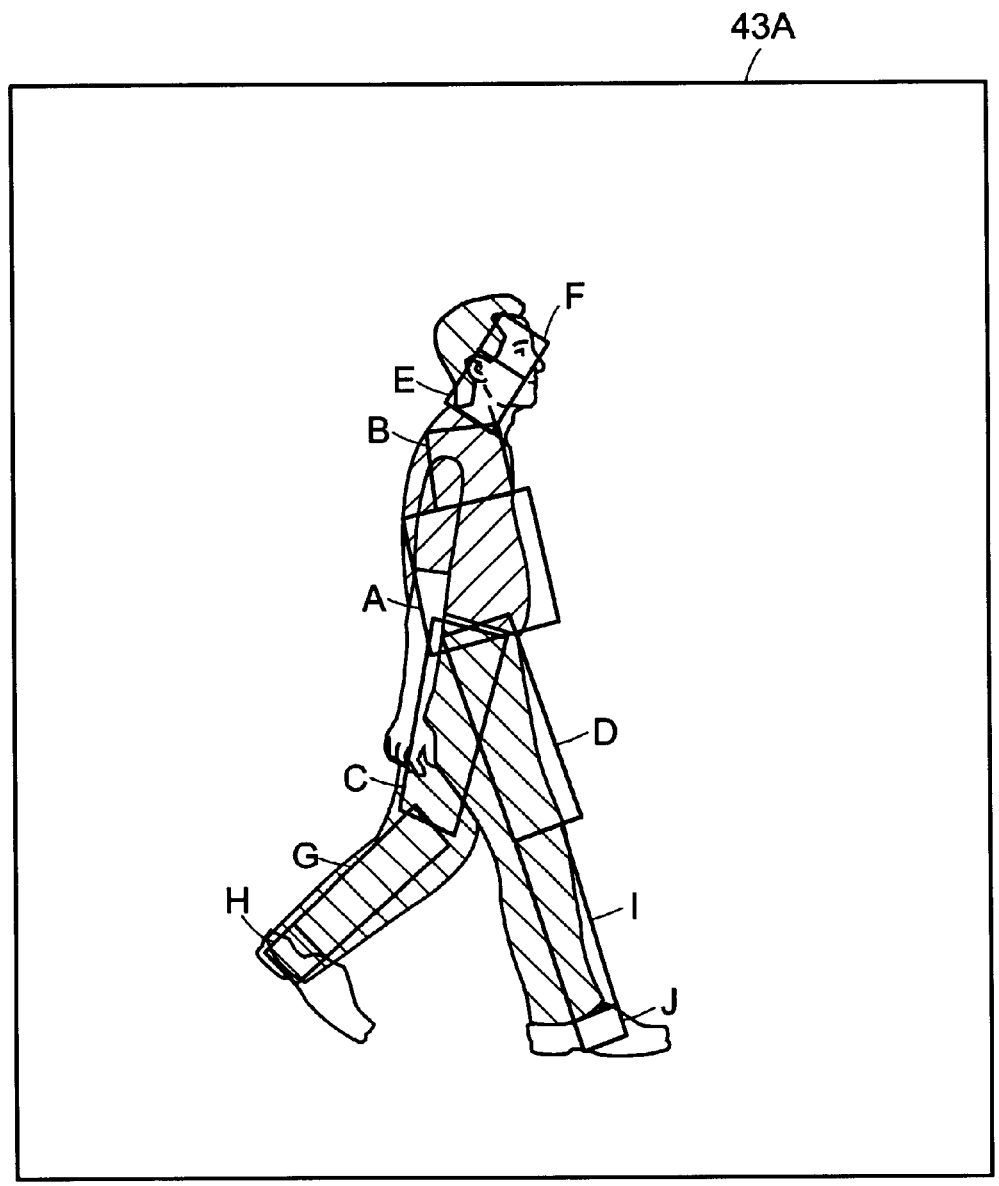

FIGS. 4A and 10B each show the respective initial, or prior states of their kinematic models, represented by stick figures 43, 43A, respectively. Weak generic priors are used in these two test cases. As the coupled dynamic feature ordering algorithm is iterated, the next template feature selected is the one requiring the least amount of search operations for registration. FIGS. 10A and 10C show, in alphabetic order, the feature ordering.

Figure 11A:
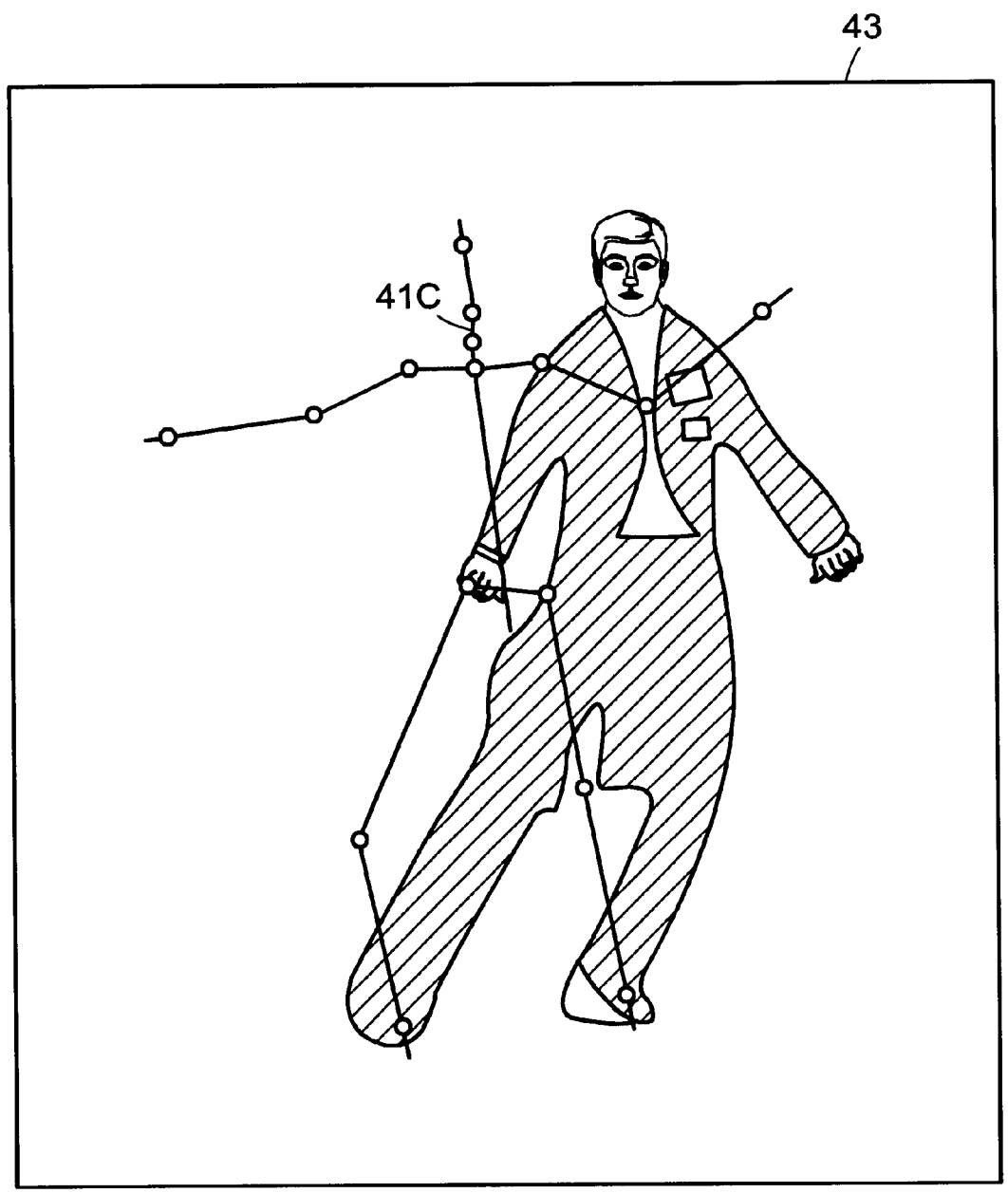
FIGS. 11A–11D are diagrams which illustrate initial states and resulting dynamic feature ordering for the images of FIGS. 10A–10C when some strong prior knowledge is used.
Figure 11B:
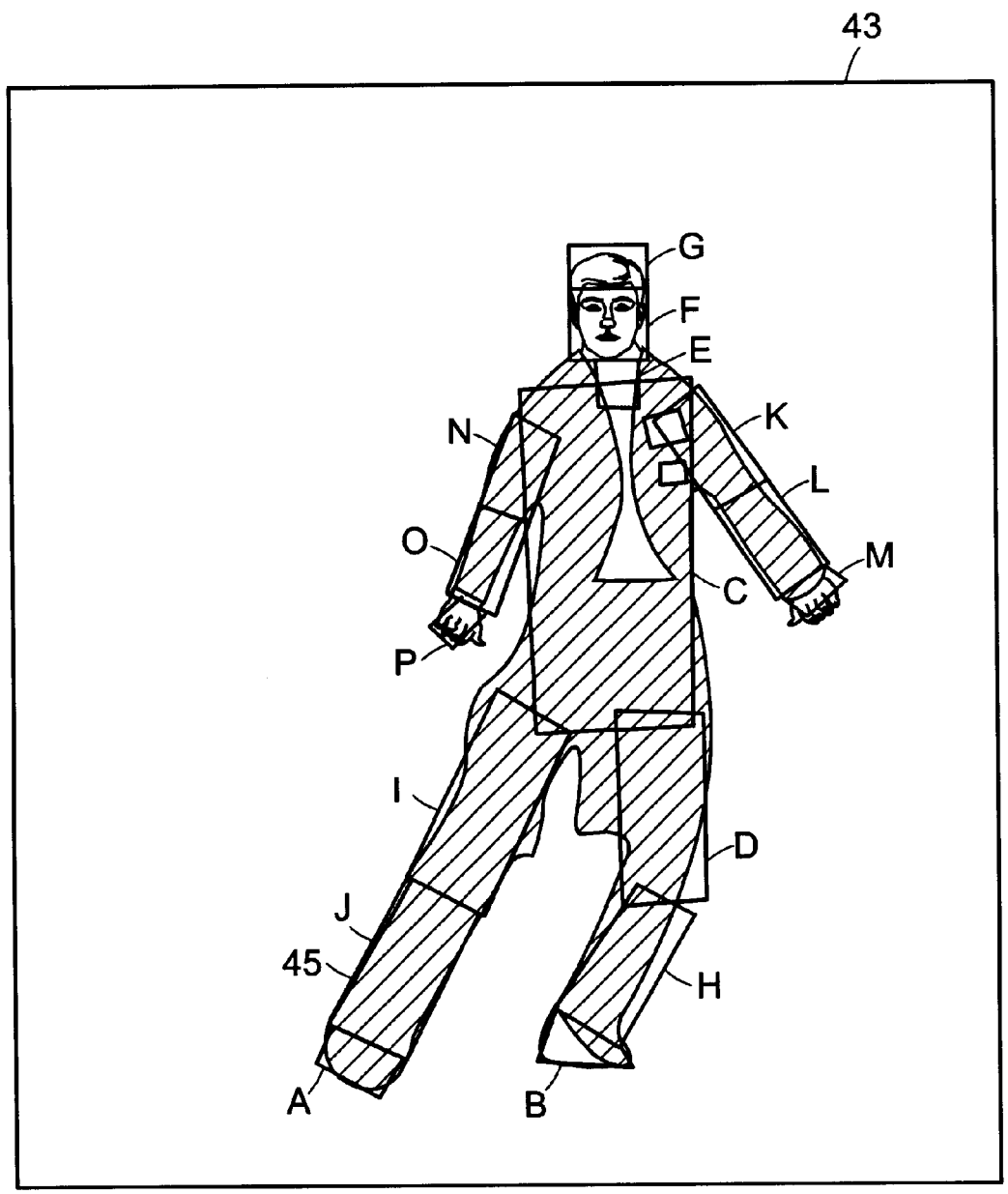
Figure 11C:
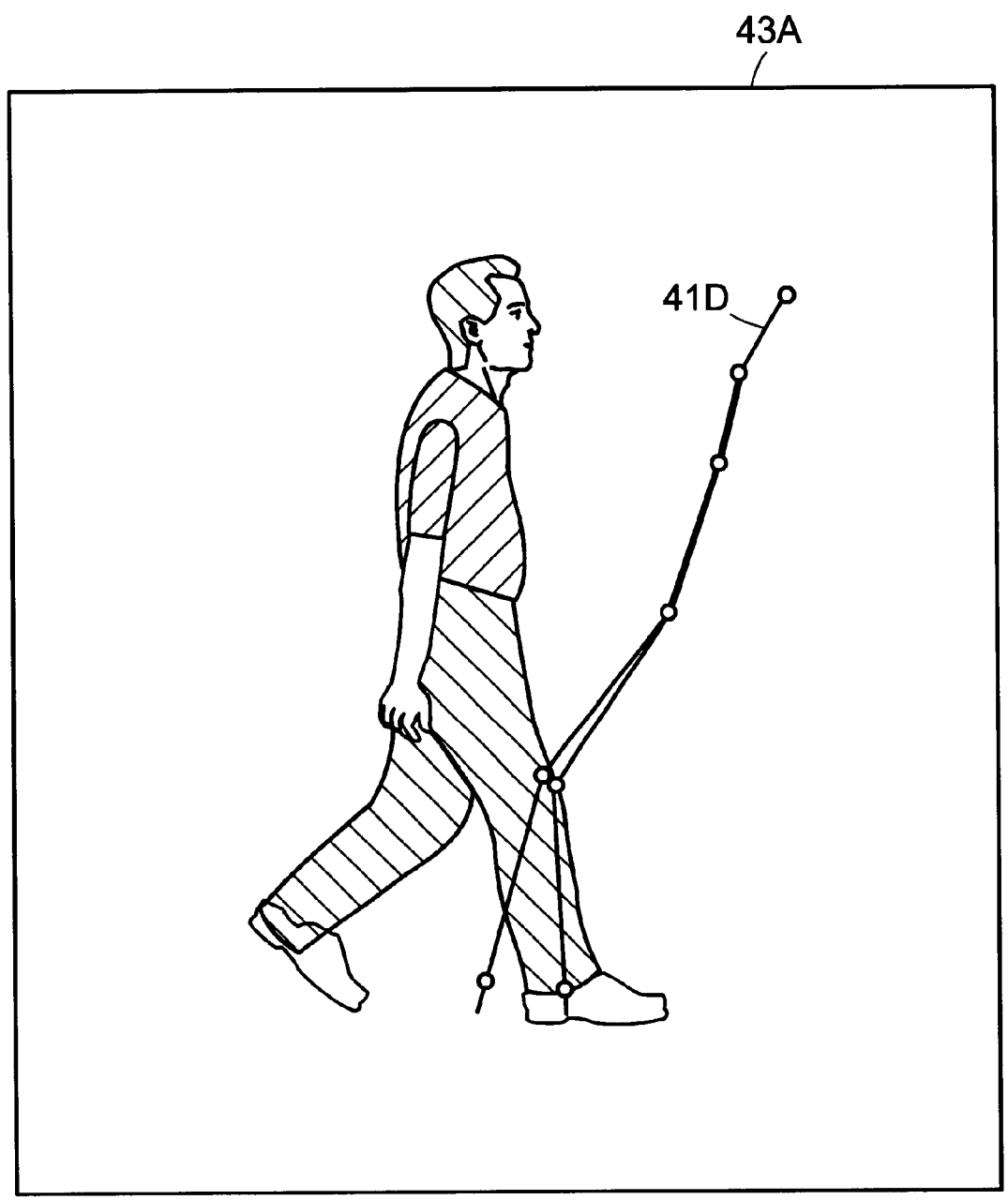

FIGS. 11A and 11C show the initial models used when various forms of strong prior knowledge are available which is captured in the prior covariance. For the image 43 of FIG. 11A, the feet template positions are accurately positioned, while for the image 43A of FIG. 11C, the front shin template position is accurately positioned. A 5-pixel standard deviation is used for these constraints. The feature ordering for these instances, shown respectively in FIGS. 11B and 11D, differs significantly from the ordering obtained in FIGS. 10A and 10C. Also notice, for example in FIG. 11D, that the optimal feature ordering does not propagate along the articulated chains which contradicts the proposed heuristic of Hel-Or et al.

In FIG. 11A, the positions of the two foot templates are assumed to be known accurately. In FIG. 11C, the position of the front shin template is known accurately. As can be seen by comparing FIG. 11B with FIG. 10A, and FIG. 11D with FIG. 10C, the feature ordering obtained when strong prior knowledge is available can be significantly different from the ordering with weak generic priors. Although not shown, the initial registration of some feature such as the left leg in the case of FIGS. 11A and 11C can be corrected as more features are integrated into the estimation.

The first sequence images generally took approximately forty to fifty seconds for the localization, while the second sequence images took approximately five to twenty seconds because of the simpler model used. In both instances the number of samples used for initializing the search of individual templates appears to be significantly more than is necessary, which is due to the conservative estimates for the span of the basins of attraction in the refinement process. More accurate estimates could easily be substituted.

Figure 11D:
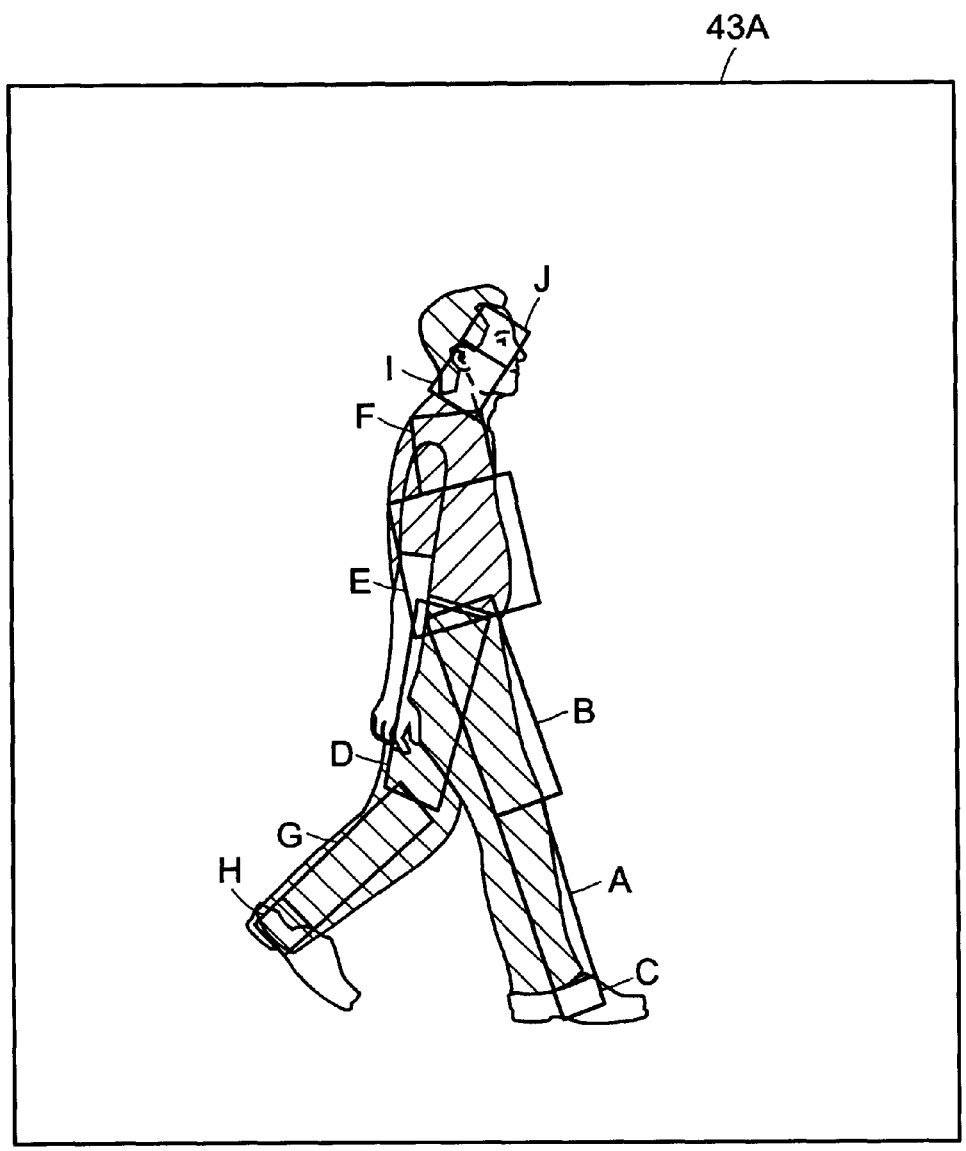
Figure 12:
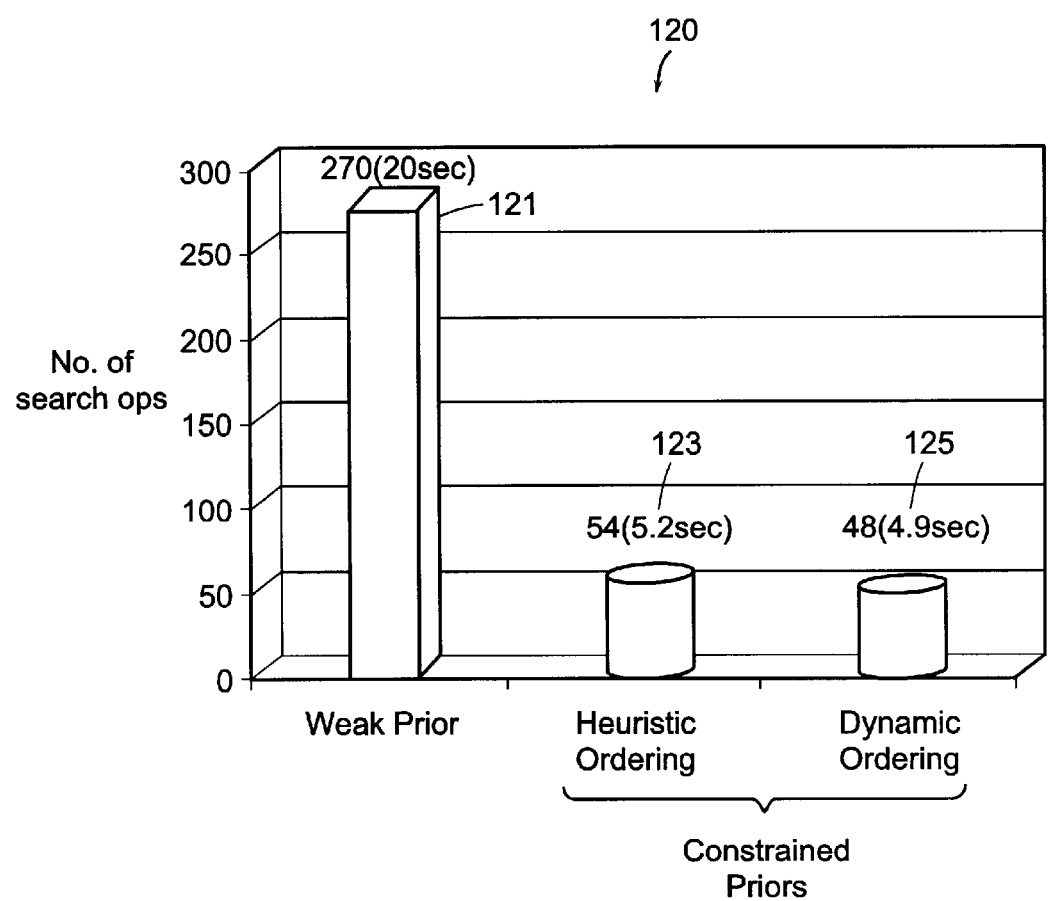
FIG. 12 is a graph comparing quantitative results for three different feature orderings using the image of FIGS. 11C and 11D.

FIG. 12 is a graph 120 showing quantitative results for a comparison of three different feature orderings using the sequence of FIG. 11D.

The left bar 121 shows, for weak prior ordering, the number of search operations and computation time required to complete the registration without prior knowledge of the location of the shin. The center bar 123, corresponding to a heuristic ordering, shows the result obtained when the shin position is known, but a heuristic-based fixed ordering of largest to smallest template is used. The right bar 125 shows the result obtained when the shin position is known and the present invention's dynamic feature ordering is used. The result provides empirical evidence that dynamic feature ordering is superior to heuristic-based fixed orderings, especially when partial prior knowledge is available.

4 Use of the Invention

Since registration is a basic problem in computer vision, an improved registration technique could impact many application domains. In particular, this invention could increase the efficiency of detection and tracking systems, making it possible to use more complex object models or process larger data sets with fixed computational resources.

Computing Optimal Fixed Feature Orderings

One use of the invention is to automatically precompute fixed feature orderings that have been tuned to a particular class of registration problems. This could be helpful in situations where the cost of computing the optimal feature ordering on-line is prohibitively expensive. It is worth mentioning that this has not been the case for the examples we have considered.

In a preferred embodiment of this method, a representative training data set consisting of a multiplicity of examples of registration problems is constructed. These examples are chosen to characterize the range of problems that a fixed ordering would need to address. An optimal feature ordering is constructed for each of the examples using the method described above. The matching ambiguities for each distinct feature are compared across the set of optimal feature orders. The result is an average matching ambiguity for each feature. Sorting the feature list on the basis of the average matching ambiguity gives a static feature order. Of course, many alternative schemes for constructing the fixed feature order could be employed.

Application to Visual Tracking

Tracking systems work by propagating an initial registration between a model and an image target over time. As each new frame arrives, the state of the model is updated in order to maintain its correspondence with the image. Before tracking can take place, the tracker must be initialized by identifying a state that places it in correspondence with an initial image. Subsequent re-initialization may be necessary to recover from failures during tracking.

Figure tracking is an important task in surveillance, user-interface, and video editing applications. It is challenging due to the complexity of the object model and its large number of degrees of freedom. This is a domain which could particularly benefit from our framework, as evidenced by the experiments in Section 3.

Tracking using detailed kinematic models of humans is computationally intensive and difficult to run in real-time, and hence simplified models are often used. This invention could enable tracking applications based on more complex models, as well as improve computational performance in tracking with simple models. Improved performance could result from automatically "tuning" the search strategy to the constraints of a particular video clip.

For example, the limited range of motion of an actor in a TV weather program can be exploited during tracking by registering the torso features first. In contrast, in sports footage such as gymnastics, alternative search orders will be more effective. In tracking a gymnast's performance on the rings, for example, the hands are the most stationary feature and would be registered first. The present invention makes it possible to perform this tuning process automatically, without the need for additional context from the footage itself.

Furthermore, tracking systems may periodically lose track of the target due to distractors such as shadows, occlusion, and background clutter. Our invention would allow trackers with complex models to be re-initialized efficiently. This would facilitate real-time tracking for applications such as a smart conference room, which could detect and initialize tracking on new entrants as well as reinitialize tracks that become lost when individuals temporarily occlude one another.

Application to Object Detection

Object detection problems arise in video and image retrieval applications, as well as in military targeting and surveillance problems. These problems are characterized by a wide range of potential sensing cues and demanding computational requirements. Efficient feature ordering could improve performance by choosing features so as to maximize the gain from each sensing operation.

For example, an interesting problem for image retrieval is the detection of figures in single images. This problem is challenging because of the wide range in human appearance and the lack of motion cues which are present, for example, in video content. A wide range of cues can be employed, including skin and hair color, silhouette edges, texture models for clothing and hair, and template models for faces, hands, and feet. The present invention makes it possible to automatically deduce the correct order in which to apply these cues, based on the contents of a given image.

While one could imagine building a dynamic feature order by hand for a specific problem like figure detection, the true potential of our invention becomes apparent when you consider the wide range of objects such as cars, buildings, etc. that may be of interest for retrieval purposes. The present invention provides a general mechanism for efficient search that is not limited to a specific type of target.

Additional Embodiments

While the method of dynamic feature ordering determines the optimal sequence of matching all available features, the total computational cost may exceed the budget allocated. For example, this can happen in a real-time tracking system where registration of the object in each image frame must be achieved within the given frame interval. In this case, as many features as possible are matched within the frame interval, while remaining unmatched features after the frame interval has elapsed are ignored. By using the sequence of dynamically ordered features, the system will match the largest number of features within the frame interval compared to other methods of feature ordering.

The cost of computing the feature ordering dynamically is typically small compared to the cost of feature matching. However, there may be rare cases when this is not true, or there may be cases when even the small computational cost of dynamic feature ordering cannot be afforded. In these cases, an attempt can be made to predict the optimal feature ordering from example runs of the registration task. Dynamic feature ordering is applied by obtaining the computed feature orderings while executing these example runs, and at the end of the runs storing the computed orderings in a training set.

The predicted optimal feature ordering can be, for example, the most common feature ordering in the training set, i.e., the mode of the set. This predetermined feature ordering is then used in the actual registration task with zero computational cost, in place of dynamic feature ordering. Learning the predicted optimal ordering from training examples is preferable to using ad hoc heuristics to guess this optimal ordering.

5. Efficient Object Tracking Via Dynamic Spatiotemporal Selection of Features

In visual tracking, an object model is registered in a sequence of images, such as the successive frames in a video sequence. Performing object registration for each frame in succession results in an estimated state trajectory for the motion of the object. Of course, a sequence of images could be indexed by some parameter other than time.

There are both on-line and off-line versions of the visual tracking problem. In the on-line case, images are produced in real-time and must be processed at some desired real-time rate within a desired latency period. For example, in a real-time inspection application, images might be produced by a high-speed camera at 120 Hz and processed by dedicated hardware in 10 ms for an effective processing rate of 100 Hz and a latency of 10 ms. In such applications, where image data is generated at tremendous rates, it is desirable to process frames as efficiently as possible. For example, improvements in processing efficiency may make it possible to use less expensive computing equipment to accomplish the same task.

In the case of off-line tracking, image frames are available all at once and can be processed in a single batch. For example, in media processing applications such as video indexing and retrieval, video is digitized and stored in a repository before it is processed. In this case, a video sequence can be retrieved and processed in its entirety. Efficient processing is still important, however, as the speed at which a video clip can be processed controls the rate at which new video clips can be entered into the repository and transmitted to customers.

Iterated Sequential Feature Selection

Figure 13:
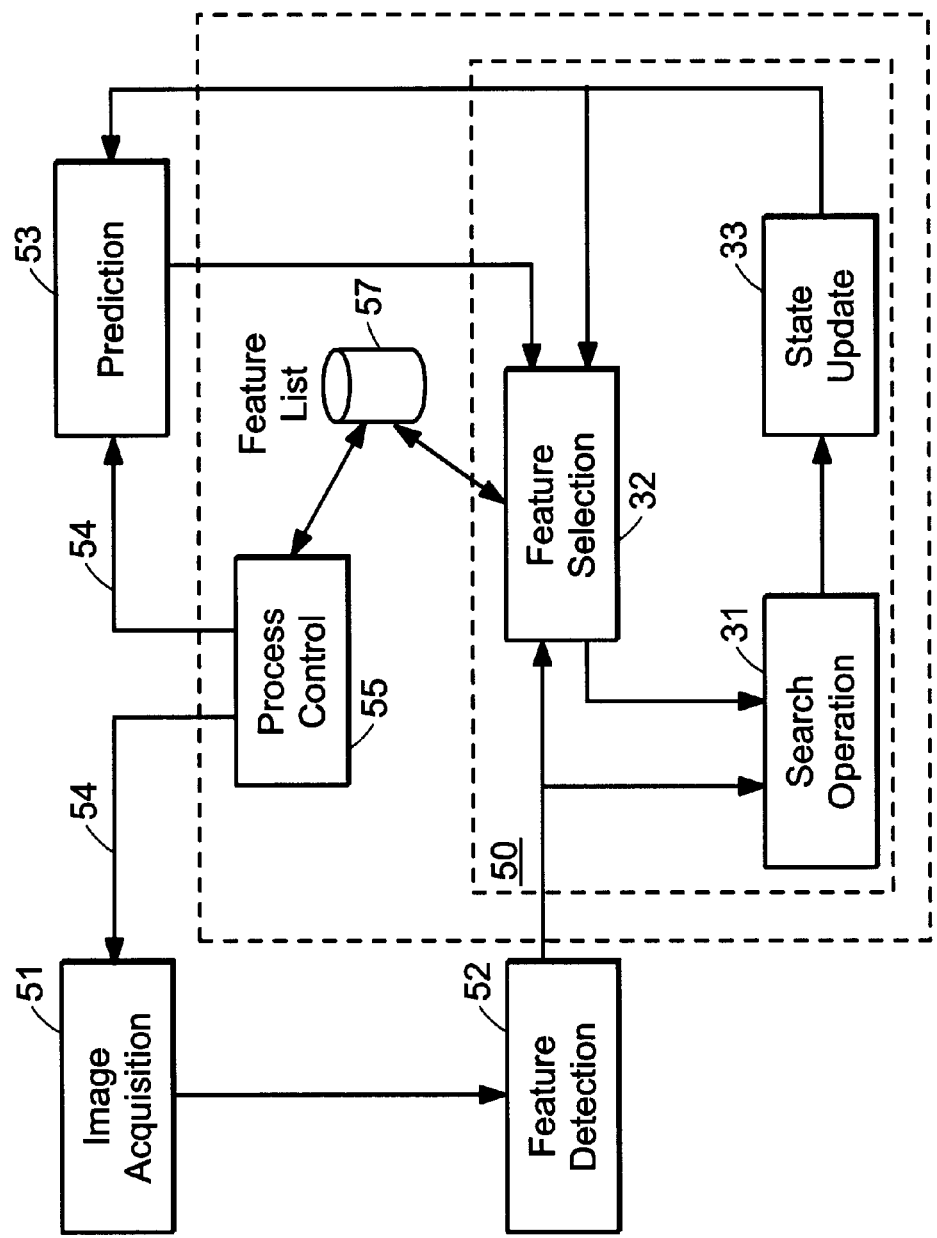
FIG. 13 is a block diagram of iterated sequential feature embodiment of the present invention.

FIG. 13 illustrates an embodiment which efficiently tracks an object by applying the optimal sequential feature selection strategy, described above with respect to FIGS. 6 and 7, to each frame of the video sequence in succession. The feature selection strategy forms the inner loop 50, receiving image frames from the image acquisition module 51 and state prior probability distribution (state priors) from the prediction module 53.

A process control module 55 regulates the process of matching features within a frame and determines when to advance to the next frame. The set of model features to be matched is stored in a list data structure 57 which is accessed by the process control module 55. An indicator such as a boolean variable is associated with each feature to indicate whether the feature is available for matching or not. Whenever a new frame is ready for processing, the process control module 55 initializes the model feature list 57, marking all features as available for matching. The feature selection module 34 accesses the feature list 57, marking features as they are matched.

The process control module 55 can base its decision to advance to the next frame on one or more factors, including, but not limited to, the number of unmatched model features or the amount of time that has elapsed during the matching loop. When the feature list 57 is empty, that is, when all features in the list 57 have been marked as matched, it is clearly time to advance to the next frame. Likewise, in an on-line system there may be a hard limit on the amount of available time for matching features. The process control module 55 can enforce this real-time constraint.

Once the process control unit 55 has determined that the system should advance to the next feature, it transmits a control signal 54 to the image acquisition 51 and prediction 53 modules, and resets the model feature list 57. The prediction module 53 uses the most recent state update to predict the state prior for the next video frame. This new prior state is used to initialize the feature selection module 34. The image acquisition module 51 acquires the next frame and transmits it to the feature detection module 52.

The feature detection module 52 represents a general operator which may, for example, do nothing, as in the case of feature-to-image matching. For feature-to-feature matching, on the other hand, the feature detection module 52 may both perform feature extraction and provide an image feature store.

Thus there are two sets of iterations within this architecture. The inner loop 50 iterates over model features while the outer loop iterates over image frames. The outer loop iteration continues until all frames are processed.

Spatiotemporal Feature Selection

The efficiency of the iterated feature selection approach is limited by the fact that the feature selection process is confined in each iteration to the contents of a single video frame. Greater efficiency may be possible in many cases if the search process can extend across multiple frames.

Registering a feature in one frame reduces the uncertainty in the positions of unregistered features in neighboring past and future frames. This is because the state estimates in consecutive frames are linked through the dynamics of the tracked object.

For example, suppose hand features have been detected with high accuracy at a certain image location in same frame k. After the hand features are processed, the state estimate for frame k localizes the hand and arm in that region of the image with high probability. Since there is a physical limit on the speed of the arm due to the dynamics of the human body, state estimates for frames k−1 and k+1 should also be updated to reflect the measurement. The pose of the arm at k−1 and k+1 is also localized near the measurement at frame k. However, the position is adjusted according to the prediction of the dynamic model, and the uncertainty is higher.

The process of adjusting a sequence of state estimates on the basis of a measurement at a particular time instant is known as "smoothing." It is described in detail in B. D. O. Anderson and J. B. Moore, "Optimal Filtering", Prentice Hall, 1979. The smoothing process generates an updated estimate of the joint probability of a state sequence. This in turn results in an update in the predicted location of unregistered features, and can potentially change the matching ambiguity across all of the frames.

Figure 14:
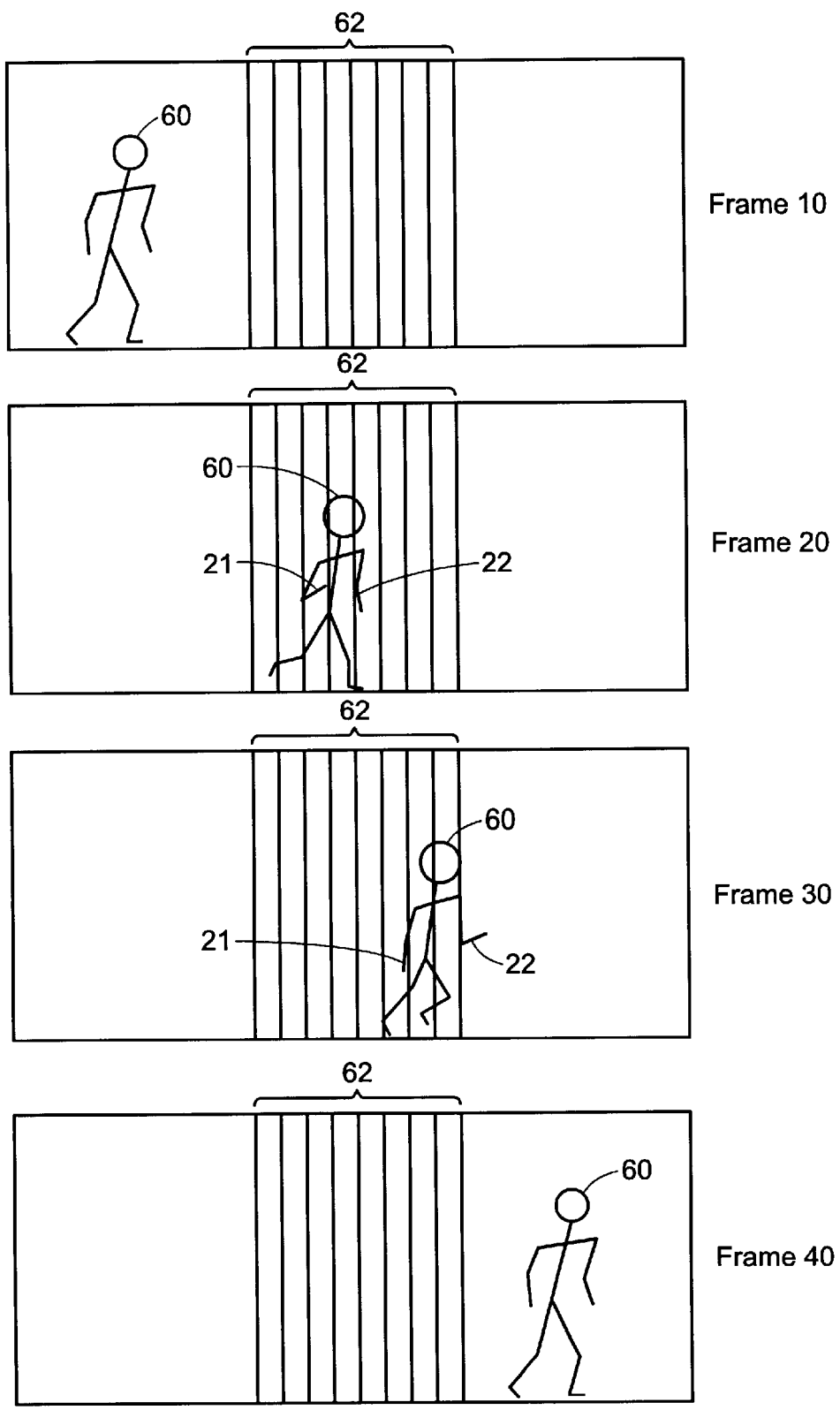
FIG. 14 is an illustration showing a figure as it is tracked by the present invention across a cluttered background.

FIG. 14 illustrates a representative situation in which a figure 60 is tracked as it moves across a cluttered background 62. Assume for this example that an image feature matching approach is being used in which the head, torso, and limbs are matched using extracted edge features. Clearly the matching ambiguity for model features will vary significantly as a function of the background. In Frames 10 and 30, all body parts can be matched with equal ease. In Frame 20, however, matching is considerably more difficult due to the presence of the distracting vertical lines in the background 62.

Figure 20:
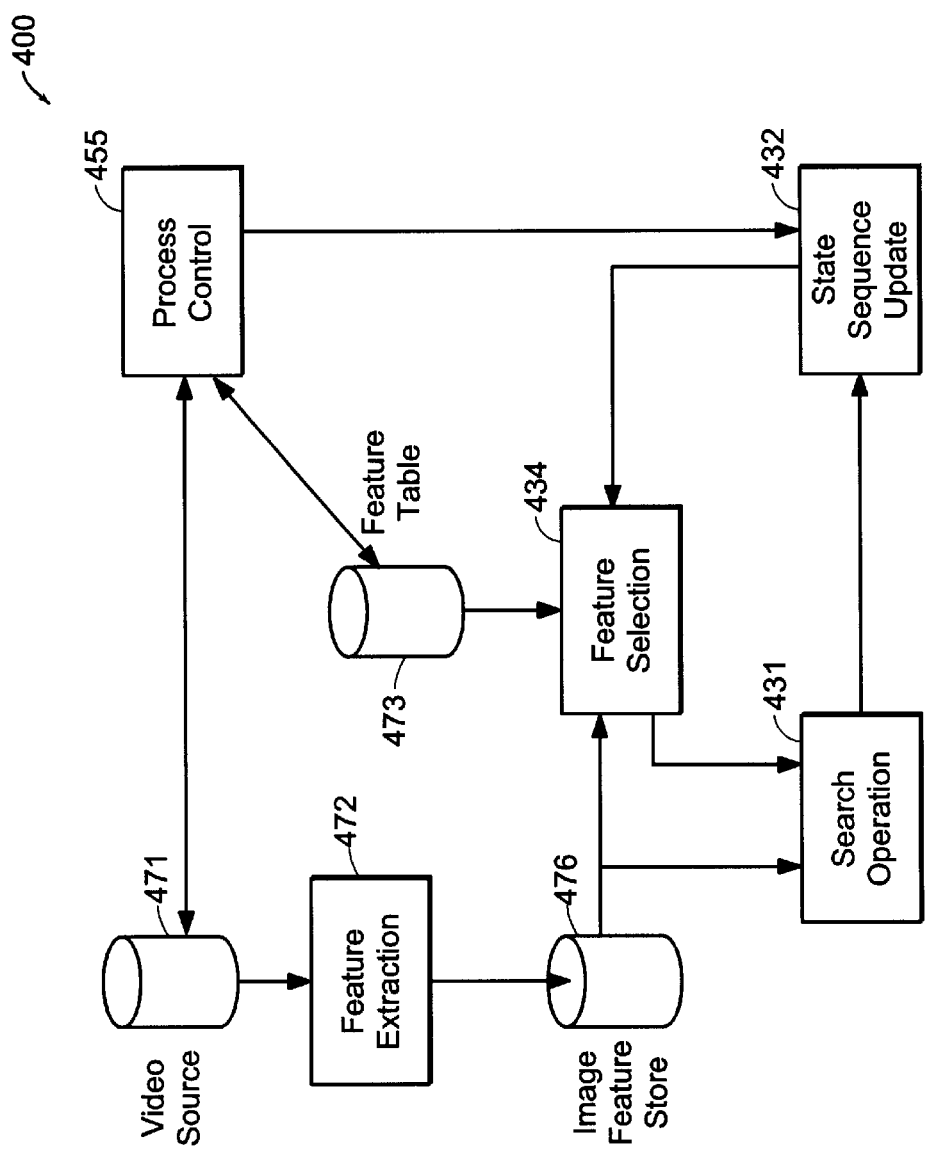
FIG. 20 is a block diagram of a on-line, spatiotemporal feature selection embodiment of the present invention.

In tracking this sequence, it would be clearly advantageous to register the FIG. 20 model in Frames 10 and 30 before processing the features in Frame 20. By localizing the figure 60 before and after it passes in front of a challenging background 62, the number of possible matches that must be examined can be reduced. This reduction is the result of better localization of the features in Frame 20 by propagation of the state estimates from Frames 10 and 30. In addition, for the interval of frames in which the FIG. 60 passes in front of the distracting background 62, the difficulty in matching specific limbs will depend upon whether or not they are aligned with the vertical lines.

For example, the right forearm 21 in Frame 20 is fairly easy to match while the left forearm 22 is not. Later, in Frame 25, the conditions are reversed. Thus, even within a set of frames in which the background is complex, there can be opportunities to register parts of the model in locally simple configurations and to use the outcome to constrain matching in more difficult situations.

Thus, a feature selection algorithm which searches across a set of frames and selects the least ambiguous features can exhibit significantly increased efficiency over an approach that simply processes all features in each frame in succession. The term "spatiotemporal feature selection" is used hereinafter to denote the selection of features across time.

Off-line Feature-to-Feature Matching

Figure 15:
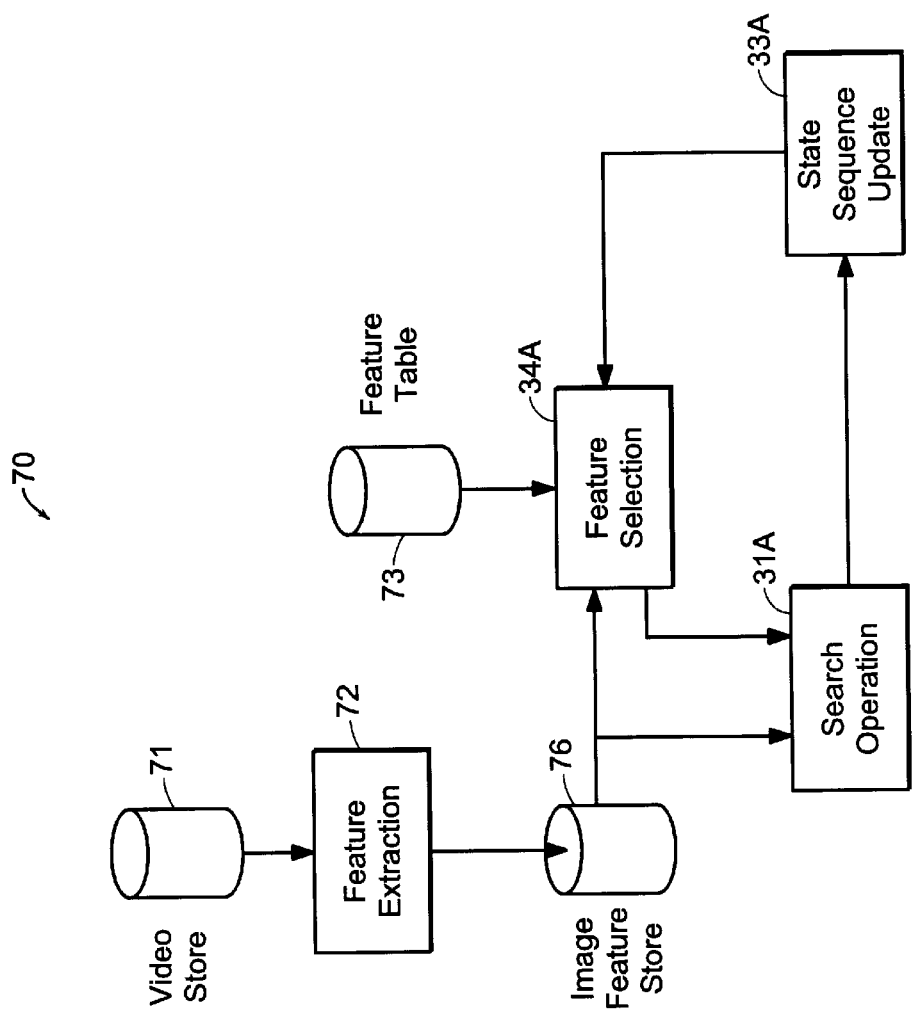
FIG. 15 is a block diagram of an off-line, feature-to feature matching spatiotemporal feature selection embodiment of the present invention.

FIG. 15 is a block diagram of an off-line, feature-to-feature matching, spatiotemporal feature selection embodiment 70 of the present invention. The suboptimality of single-frame feature selection is overcome by allowing the feature selection module 34A to consider model features across all of the frames in the sequence.

This is accomplished by replacing the model feature list 57 of FIG. 13 with a table 73 of available model features for each frame, indexed by frame number.

FIG. 16 illustrates an example of this table 57. For each model feature in each frame, the table 73 has an availability field 74 which indicates whether the feature is available for matching in the respective frame, and a matching ambiguity field 75 which holds the feature's matching ambiguity for the respective frame. Other information about features such as size or pixel content only need to be stored once for each model feature.

In this embodiment 70, the model feature selection module 34A analyzes the unmatched model features across all available frames to determine which feature to search next. The output of the feature selection module 34A is a pair <feature id, frame id> specifying a particular model feature to be searched in a particular video frame.

The image feature store 76 holds the extracted image features from a sequence of video frames in batch format. It is constructed by passing all of the frames in a video store 71 through a feature extraction module 72. Note that this embodiment assumes that the entire set of frames is available for processing all at once, consistent with the off-line formulation. Since image features may be searched in any order, it is important to keep track of which image features have been matched and which are available for searching. The image feature store contains this information.

In this manner, the feature ordering is determined dynamically during the tracking process, with the maximum flexibility of selection. Both prior knowledge and image data are allowed to influence the feature ordering.

For the spatiotemporal selection process, prior knowledge takes the form of a distribution over a time-sequence of state vectors. This is in contrast to the single-frame sequential feature selection method, in which the distribution is over a single state vector. The distribution over a sequence reflects the fact that processing a feature in a particular frame will update the state estimates for frames occurring both before and after the given frame, in accordance with the dynamic model for the tracked object.

The state sequence update module 33A is responsible for updating the distribution over the state sequence. Its input is a particular model feature match in a particular frame computed by the search operation module. Note that the need to propagate state uncertainty over time, in accordance with the system dynamics, is a key characteristic of the tracking problem.

Since the state sequence distribution changes as each feature is processed, it follows that the matching ambiguity for all of the model features in each frame can potentially change after a single model feature has been processed. In fact, if this were not the case, then the spatiotemporal selection process would produce the same result as the iterated sequential selection process.

Off-line Feature-to-Image Matching

Figure 17:
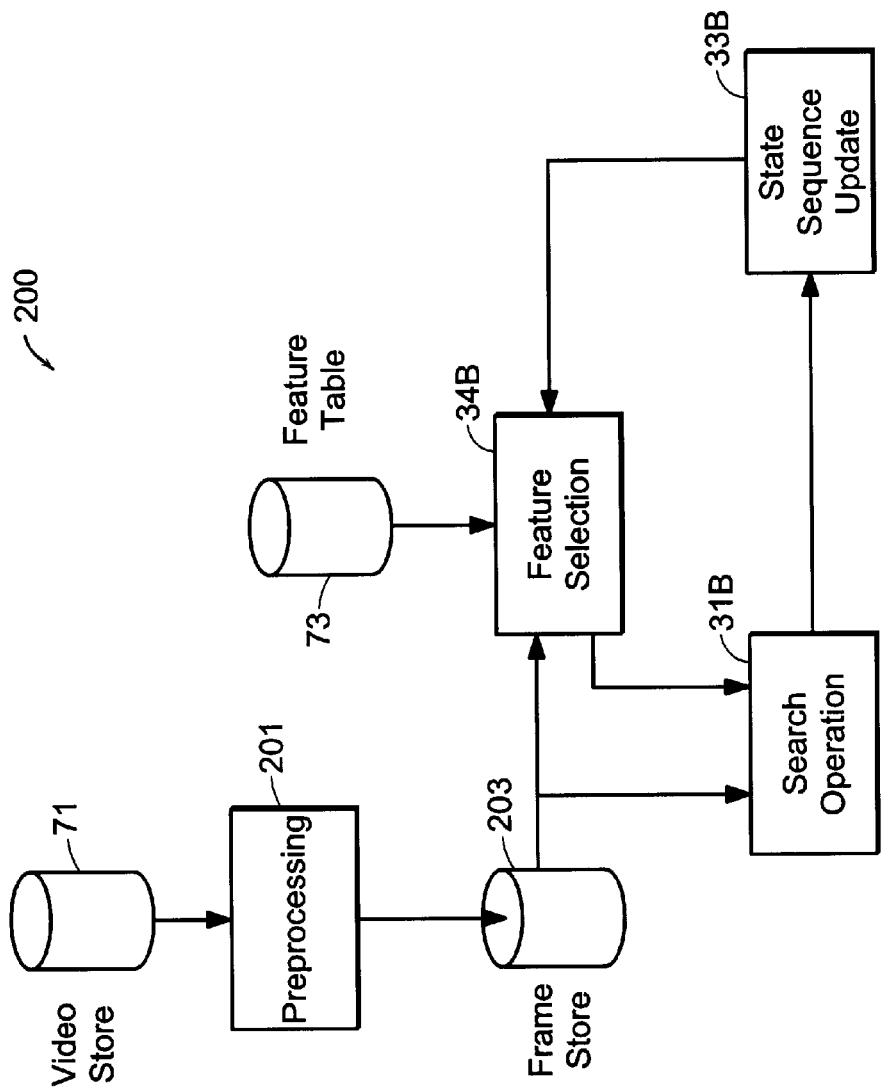
FIG. 17 is a block diagram of an off-line, feature-to image matching, spatiotemporal feature selective embodiment of the present invention.

FIG. 17 is a block diagram of a feature-to-image matching embodiment 200 of the off-line spatiotemporal feature selection process. In this case the feature selection 34B and search operation 31B modules receive their inputs from a frame store 203 which holds image frames for direct feature-to-image matching.

In some cases of feature-to-image matching, it may be advantageous to subject each video frame to a preprocessing step 201 that restricts the number of image regions which must be searched. For example, a face feature model might be used in the example of FIG. 14 to localize the head. This feature model might consist of a neural network template model such as the one described by H. A. Rowley, S. Baluja, and T. Kanade, "Neural Network-Based Face Detection", IEEE Transactions on Pattern Analysis and Machine Intelligence, Volume 20, number 1, pages 23–38, January 1998, incorporated herein by reference. This template model can be computationally expensive to employ in feature-to-image matching.

It would therefore be beneficial to first employ an inexpensive skin color detection process which identifies regions of skin colored pixels in an image frame. An example would be the histogram-based skin detector described by M. J. Jones and J. M. Rehg, "Statistical Color Models with Application to Skin Detection", Proceedings of IEEE Conf. on Computer Vision and Pattern Recognition, volume 1, pages 239–245, Ft. Collins CO, June 1999. Regions which do not contain a significant percentage of skin-colored pixels could then be excluded from search. The preprocessing module 201 performs this detection operation for each frame in the video store. The resulting frame store 203 holds the pixel values and preprocessor output for each image, indexed by frame number.

Figure 18:
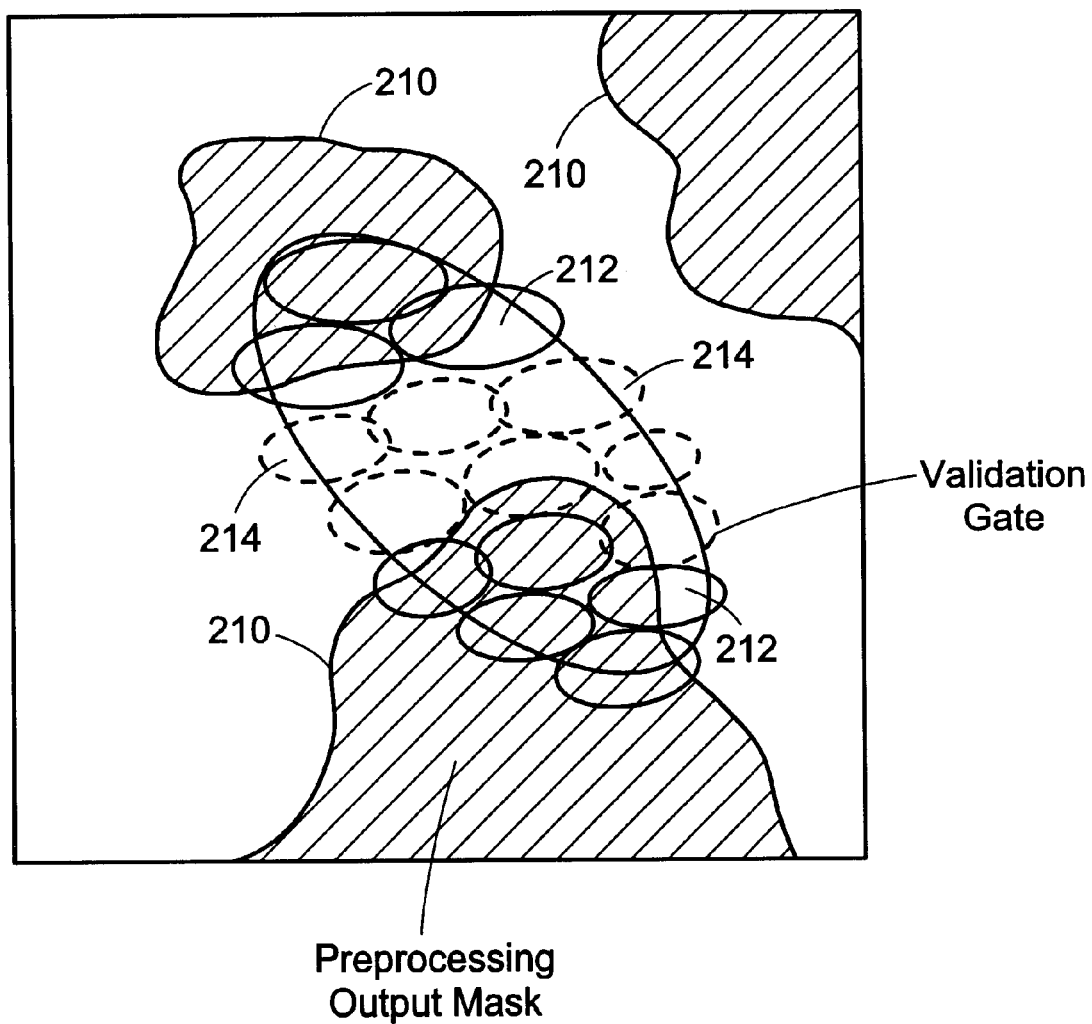
FIG. 18 is a schematic diagram illustrating the role of preprocessing in the embodiment of FIG. 17.

The role of preprocessing in feature-to-image matching is illustrated in the example of FIG. 18. The shaded regions 210 denote pixels selected by the preprocessing step, such as the aforementioned skin color detection. Basin of attraction regions 212 which are drawn with solid lines are supported by preprocessing and will be searched. Basin of attraction regions 214 drawn in dotted lines lie outside the shaded regions 210 and are unsupported. These regions 214, therefore, will not be searched.

Note that in the absence of a preprocessing step 201, all regions 212, 214 would be searched, as described earlier. Of course, preprocessing can be based on many attributes other than skin color. For example, the local spatial-frequency content of the image could be examined to obtain a measure of the number of local minima for a template-based feature model.

While preprocessing can be viewed as a feature detection step, the difference is that it simply provides information about the desirability of performing matching in a particular part of the image, rather than providing a direct constraint on the state space estimate.

It is worth noting that in the absence of preprocessing, the basic feature-to-image matching method may not exhibit interesting spatiotemporal feature orderings. The reason is that the matching ambiguity in the feature-to-image case, described above, depends only upon the size of the feature template and the state probability, and not on the pixel data in a given frame. As a result, there is no reason for the algorithm to show preference for one frame over another in registering features. Thus preprocessing is likely to be very helpful in many situations, both in the spatiotemporal embodiment and in the original sequential matching embodiment.

The feature-to-feature 70 (FIG. 15) and feature-to-image 200 (FIG. 17) embodiments have many modules which provide common functionality. The details of these modules are now described. The spatial registration framework, analysis of spatial features, and search operation in the spatiotemporal feature selection process are similar to those described previously for sequential feature selection. Differences in the operation of modules in the spatiotemporal embodiment are described in detail below.

Dynamic Feature Ordering and Selection

The search for the model feature with the lowest matching ambiguity extends across image frames. It is useful to define a search window, which specifies the range of frames over which the search should occur. In some cases this will simply be all of the frames in the frame store. In other cases, such as on-line tracking, this might be a window of five frames that includes the most recently acquired frame.

The search process can be performed in several ways. In a situation where we want to match all of the features we must perform an exhaustive search over all features in all frames. For example, the outer loop searches over frames while the inner loop searches all features within a frame.

When the number of features to choose from is very large, it may not be important to find the single feature with the lowest matching ambiguity. Rather there may be a number of features, each of whose matching ambiguity lies below a pre-defined or adaptive threshold. In that case, it is sufficient to identify the first model feature with below-threshold ambiguity, at which point the search could terminate. This is the "threshold heuristic."

This is an important practical consideration, since for a model with twenty features applied to sequence of 1000 frames there would be 20,000 possible feature matches to evaluate in deciding which feature to select at each iteration of the algorithm.

It may also be the case that the matching ambiguity for certain easily localized features will not change dramatically after a small number of state updates. A search strategy that can exploit this "invariance heuristic" along with the previous threshold heuristic is now described. The key idea is to maintain a sorted version of the model feature table based upon partially-updated matching ambiguities.

The method assumes that updating matching ambiguities is costly, while sorting the matching ambiguities is inexpensive in comparison. This is reasonable because updating matching ambiguities involves examining potentially large numbers of image features and computing validation gates for each feature in each frame. In contrast, the time complexity of comparison sorts such as quicksort is $O(n \log n)$ with reasonable constant factors where n is the number of features to be examined. Information about sorting algorithms can be found, for example, in Cormen, Leiserson, and Rivest, "Introduction to Algorithms", MIT Press 1990.

Figure 19:
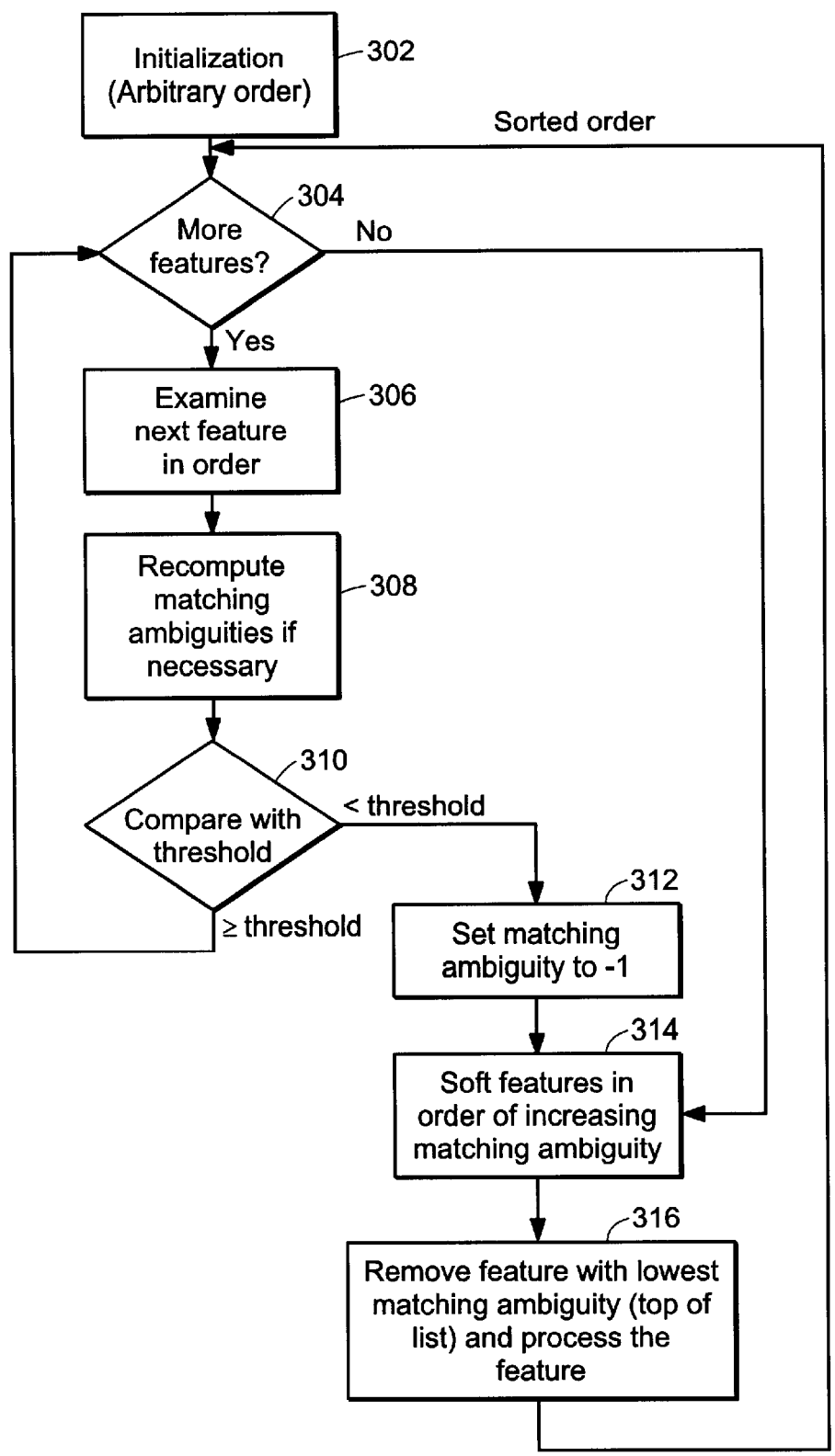
FIG. 19 is a flowchart of an algorithm employing threshold and invariance heuristics as used by the present invention.

FIG. 19A is a flowchart 300 illustrating an algorithm employing threshold and invariance heuristics. Assume that after initialization 302, no matching ambiguities have yet been computed and that the features are in some arbitrary order. First, step 304 determines whether there are more features to be examined. If so, then, at step 306, the next feature in the ordered list is examined. The feature's matching ambiguity is recomputed if necessary in step 308, as discussed below, and compared to the ambiguity threshold in step 310. If the matching ambiguity is below the threshold, then the scan terminates and the matching ambiguity is reset to −1 at step 312. Otherwise, the scan returns to step 304 to process the next feature. If the end of the feature list is reached at Step 304, the scan terminates.

Once the scan terminates, then at step 314, the table is sorted in order of increasing ambiguity using a method such as quicksort. In step 316, the feature with the lowest ambiguity is removed from the table and processed, i.e., matched, and the model states are updated. The sequence of steps repeats, but starting with a sorted order.

If a below-threshold feature was identified in step 310, then it will be at the head of the list after step 314 and will be selected in step 316, because computed matching ambiguities are always greater than zero. If no below-threshold features were found, then the method selects the feature with the lowest ambiguity. The sorting step 314 helps to ensure that the scanning stage (steps 304–312) examines the most promising features first, improving the chance that the scan will terminate before all features are examined.

Of course, if the matching ambiguities for each feature changed arbitrarily between update steps, sorting would be of little value. Fortunately, the cost of sorting is sufficiently low relative to the rest of the system.

Matching ambiguities for features that are not affected by a state update need not be recomputed in step 308. This is explained below. An important difference between this embodiment and a standard sorting algorithm is that there is no guarantee that the table will be maintained in correct sorted order, because the matching ambiguities for a feature may have changed, while the table may not have been updated. Thus there is no guarantee that the top feature will have the lowest ambiguity unless the entire table has been scanned. And that will happen only if there is no below-threshold feature.

State Sequence Update

The state sequence update module 33A or 33B performs fixed-interval smoothing in calculating the state uncertainty at each time instant based on the total set of measurements over the interval. The interval can extend over the entire set of frames in the frame store, or in other cases, such as with on-line tracking, it may be more appropriate to perform fixed-lag smoothing, i.e., smoothing over a small number of frames including the most recent one. Equations for fixed interval and fixed lag smoothing can be found in standard textbooks on Kalman filtering, such as B. D. O. Anderson and J. B. Moore, "Optimal Filtering", Prentice Hall, 1979, Sections 7.3 and 7.4, incorporated by reference herein.

In one embodiment, each new measurement to be processed following the search operation is added to the entire set of measurements over all frames and the optimal state sequence is re-estimated using fixed interval smoothing. Measurements include information obtained from the matching operation, such as the optimal feature state $u_b$ and its associated covariance $S_b$ when using Gaussian probability distributions, as described previously in section 2.6.

The update module 33A or 33B maintains a table of measurements. This table stores the set of measurements associated with each frame, based on the matches produced by the search operation module. Measurements obtained from each new match are added to this table. Note that for frames in which there are no measurements, pure prediction is used to propagate the state uncertainty.

In many cases, the number of frames will exceed the dominant time constant for the dynamic model by a significant multiplier. Computational savings can be achieved in this case by restricting the update step for a new measurement to those frames that lie within an "update window." This window is centered on the frame in which the measurement occurred and spans a few multiples of the dominant time-constant.

For example, in tracking a figure in a room, exact knowledge of the state of the figure at a particular time-instant is of little value in estimating its state an hour earlier or an hour later. In that interval of time, the target can attain any conceivable pose. On the other hand, when tracking with a sampling interval of 1/30 of a second, which is the NTSC video rate, the state at a particular video frame is closely related to the state in adjacent video frames. This is an important practical consideration, as it affects the number of matching ambiguities that need to be recomputed after updating the state sequence. Any features in frames lying outside the update window will have the same matching ambiguity as they did before the update step and therefore do not need to be re-examined.

The spatiotemporal feature selection process has the desirable property that registration can proceed using the features that are easiest to match, regardless of their position in the sequence. As a result, the state trajectory estimate can converge quickly to the vicinity of the correct trajectory, making it easier to localize subsequent features.

In the case where the frame store contains a single frame, the spatiotemporal selection process described above simplifies to the sequential feature selection process shown in FIGS. 6 and 7.

Spatiotemporal Feature Selection for On-line Tracking

FIG. 20 is a block diagram of an on-line embodiment 400 of the spatiotemporal feature selection process. The primary difference in comparison to the off-line embodiment 70, 200 of FIGS. 5.5 and 5.7 respectively is the addition of a process control module 455. This module 455 regulates the addition of new video frames as time advances.

Another difference concerns the table of model features 473. In the off-line case FIGS. 15 and 17, the model feature table 73 is of fixed size, determined in advance by he number of frames in the video store. In the on-line embodiment 400 of FIG. 20, the model feature table 473 grows as frames are added.

The basic spatiotemporal feature selection module 434 does not place any constraints on the feature table 473, and is therefore identical to off-line feature election module 73. The same is true of the search operation modules 31, 431. The process control module 455 updates the feature table 473 and state sequence probabilities whenever a new frame is acquired.

The on-line embodiment 400 has two possible operating modes, synchronous and asynchronous. In the synchronous mode, the process control module 455 signals a video source 471 such as a video camera whenever the system is ready to process a new frame. A new frame is then acquired, and either feature extraction 472 or preprocessing (not shown) are performed on the frame. The output of this last process is then placed in either a feature store 476 or a frame store (not shown). The distinction between feature extraction and preprocessing is based on whether feature-to-feature or feature-to-image matching is being performed.

In the asynchronous mode of operation, the video source 471 is-continually acquiring frames at some fixed rate, such as 30 frames/sec for NTSC video. Preferably, the video source 471 signals the process control module 455 whenever a new video frame becomes available. The process control module 455 then decides whether to include the new frame for processing or ignore it while continuing to process the current set of frames.

In both the synchronous and asynchronous cases, the process control module 455 decides when to include a new frame for processing, and updates the system to reflect the addition if the new frame is included. The feature table 473 is updated by adding a new block of model features corresponding to the new frame. These features are marked as being available for matching, and their matching ambiguities are set to a default value such that the feature selection module 434 will recompute them.

The process control module 455 then sends a signal to the state sequence update module 432, which adds an additional state vector to the state sequence to reflect the additional frame. The probability distribution for this new state vector is initialized through prediction based on the previous set of measurements. The updated state sequence distribution is then sent to the feature selection module 434 for use in examining the updated feature table.

This embodiment 400 has the desirable property that it supports on-line operation with minimal changes to the processing system.

The method described generalizes to many other situations where information is extracted from signals by processing features optimally. We have discussed a signal which is a video sequence, but a signal could also be an audio source or a sequence of genetic data. Features have been described as attributes of an object's image appearance, but they could also be elements of a speech signal or biological markers. In many of these other situations, the optimal feature processing method described above could be used to reduce the processing cost.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for tracking an object model in a sequence of frames, the object model comprising a plurality of features, the object model described by a model state, the method comprising:

for each unregistered model feature, determining a number of search operations required to find a match with at least a predetermined probability by:

(i) finding search regions within a feature space, in which each region has an associated probability density that exceeds a predetermined threshold;

(ii) summing the probabilities associated with each of the found search regions to form a total probability;

(iii) while the total probability is less than a predetermined probability, lowering the threshold, and repeating the steps of finding search regions and summing the probabilities; and (iv) computing the number of required search operations based on the determined search regions;

selecting a feature requiring a least number of search operations such that an unregistered model feature of the object model and an available frame from the sequence of frames are selected;

searching for a match of the selected model feature to the selected frame's image to register the feature;

updating the model state for each available frame based on the match found in the searching step;

repeating the steps of selecting, searching and updating.

2. The method of claim 1, wherein, at any given time, only one frame is available, frames being available in sequential order, the method further comprising:

iteratively registering features of the object model in an available frame, each iteration comprising said steps of selecting, searching, updating with respect to the available frame;

terminating the step of iteratively registering features;

acquiring a next frame;

predicting a state prior for the next frame, using a most recent state update; and repeating the steps of iteratively registering, terminating, acquiring and predicting, upon each repetition registering features responsive to the state prior predicted by the previous repetition.

3. The method of claim 2, wherein the step of iteratively registering features comprises:

selecting an unregistered feature of the object model to minimize a cost function of a subsequent search;

searching for a match of the selected model feature to the image to register the feature;

updating the model state; and repeating the steps of selecting, searching and updating.

4. The method of claim 2, further comprising:

maintaining a list of model features to be matched, each listed model feature associated with an indicator which provides an indication as to whether the respective model feature is available for matching;

marking a feature as unavailable when it is matched; and marking all features as available upon acquiring a new frame.

5. The method of claim 2, wherein determining when to advance to a next frame is based on a number of unmatched model features.

6. The method of claim 2, wherein determining when to advance to a next frame is based on an amount of time elapsed while iteratively registering features for a current frame.

7. The method of claim 1, further comprising:

maintaining a list of <feature, frame> pairs which have been matched.

8. The method of claim 1, wherein all frames of the sequence of frames are available.

9. The method of claim 1, further comprising:

for each available frame in the sequence, extracting features from the frame, wherein searching for a match comprises feature-to-feature matching.

10. The method of claim 1, wherein searching for a match comprises feature-to-image matching.

11. The method of claim 10, further comprising:
for each available frame in the sequence,
preprocessing the frame, and
restricting the number of image regions to search.

12. The method of claim 11, wherein preprocessing comprises:
identifying regions of at least one predetermined color, such that restricting the number of image regions to search comprises searching only the identified regions.

13. The method of claim 12, wherein the at least one predetermined color is a skin color.

14. The method of claim 11, wherein preprocessing comprises:
examining local spatial-frequency content of the frame's image; and
identifying regions in which to search based on the local spatial-frequency content.

15. The method of claim 1, wherein all of the steps are performed off-line.

16. The method of claim 1, further comprising:
defining a search window which specifies a range of frames from which a feature can be selected.

17. The method of claim 16 wherein the search window includes all available frames.

18. The method of claim 16 wherein the search window comprises five frames including a most recently acquired frame.

19. The method of claim 1 wherein the selected model feature is associated with a lowest cost.

20. The method of claim 1 wherein the selected model feature is associated with a cost which is less than a threshold.

21. The method of claim 20, wherein selecting comprises:
for each unregistered feature of each available frame, determining a cost of search operations required to find a match with at least a predetermined probability, until a feature is found which has an associated cost less than the threshold; and
selecting the feature.

22. The method of claim 21, wherein if no feature is found which has an associated cost less than the threshold, selecting further comprises:
selecting a feature with the lowest determined cost.

23. The method of claim 20, wherein selecting further comprises:
maintaining a list of features;
assigning a minimum cost to a feature which has an associated cost less than the predetermined threshold; and
ordering the list according to determined cost, such that a feature with lowest determined cost is listed at the top of the list.

24. The method of claim 23, further comprising:
after searching for a match of the selected feature and updating the model, recalculating the cost only of features affected by the state update.

25. The method of claim 20, wherein the threshold is a predetermined threshold.

26. The method of claim 20, wherein the threshold is an adaptive threshold.

27. The method of claim 1, further comprising:
defining an update window which specifies a range of frames for which the model state is updated.

28. The method of claim 27, wherein the update window is centered around a frame in which the most recent matching occurred.

29. The method of claim 27, wherein the update window spans between 2 and 7 multiples of a dominant time constant.

30. The method of claim 1, wherein all of the steps are performed on-line, the frames provided by a source.

31. The method of claim 30, wherein the source is a video source.

32. The method of claim 31 wherein the video source is a video camera.

33. The method of claim 31, further comprising:
providing a signal to the video source to acquire a next frame.

34. The method of claim 31, further comprising:
providing frames from the video source at a fixed rate.

35. The method of claim 34 wherein the fixed rate is 30 frames per second.

36. The method of claim 30, further comprising:
upon the acquisition of a new frame from the source, determining whether to use the new frame; and
if it has been determined to use the new frame, adding a new state vector to a state sequence; and
initializing the new state vector based on a previous set of measurements.

37. The method of claim 1, wherein the sequence of frames comprises a video sequence.

38. The method of claim 37, wherein features are attributes of an object appearance.

39. The method of claim 1, wherein the sequence of frames comprises an audio sequence and the image is audio image.

40. The method of claim 39, wherein features are elements of a speech signal.

41. The method of claim 1, wherein the sequence of frames comprises a sequence of genetic data.

42. The method of claim 41, wherein features are biological markers.

43. The method of claim 1, wherein the cost function is based on the feature's basin of attraction.

44. The method of claim 43, wherein the cost function is further based on complexity of searching at each basin of attraction.

45. The method of claim 1, wherein searching is performed in a region of high probability of a match.

46. The method of claim 45 wherein a search region is based on a projected state probability distribution.

47. The method of claim 1, wherein searching is based on maximizing a comparison function.

48. The method of claim 1 wherein selecting and searching are responsive to a propagated state probability distribution.

49. The method of claim 48 wherein the state probability distribution is projected into feature space.

50. The method of claim 1, wherein searching comprises feature-to-feature matching.

51. The method of claim 50, wherein the number of search operations is the number of target features located within each search region.

52. The method of claim 51 wherein the number of target features located within the search region is based on Mahalanobis distances to potential target features.

53. The method of claim 50 wherein target features are approximately uniformly distributed, and the number of features is proportional to the search region's size, the method further comprising:
ranking the features according to the sizes of the associated search regions.

54. The method of claim 1 wherein searching comprises feature-to-image matching.

55. The method of claim 54 wherein computing the number of required search operations comprises, for each search region,
    dividing the region into minimally-overlapping volumes having a same size and shape as a basin of attraction associated with the feature; and
    counting such volumes required to cover the regions.

56. The method of claim 55, wherein counting volumes is approximated by:
    obtaining eigenvalues and eigenvectors to a covariance matrix associated with the feature search region;
    calculating a basin of attraction span for each eigenvector direction; and
    approximating a count responsive to the eigenvalues and the spans.

57. The method of claim 1, wherein model states are updated according to a propagated state probability distribution.

58. The method of claim 57, wherein the propagation of the probability distribution is based on successive registered features.

59. The method of claim 1, wherein the state probability model has a Gaussian distribution.

60. The method of claim 59, wherein the state probability model is propagated using a Kalman filter update step.

61. The method of claim 1, wherein the step of repeating continues only until a predetermined level of certainty in an estimate of the model is achieved, such that some of the available features are not registered.

62. The method of claim 1, further comprising:
    providing a training set of registration tasks;
    for each registration task, determining an optimal feature ordering by performing the steps of selecting, searching, updating and repeating;
    responsive to the optimal feature orderings, determining a fixed ordering; and
    registering the object model in the image using the fixed ordering.

63. A system for tracking an object model in a sequence of frames, the object model comprising a plurality of features, the object model described by a model state, comprising:
    a feature selection module which, (a) for each unregistered model feature, iteratively finds search regions within a feature space such that each region's associated probability density exceeds a predetermined threshold, sums the probabilities associated with each of the found search regions to form a total probability, and if the total probability is less than a predetermined probability then lowering the threshold and performing another iteration, computes a number of required search operations based on the found search regions, and (b) selects an unregistered model feature requiring a least number of search operations such that the feature selection module selects an unregistered model feature of the object model and an available frame from the sequence to minimize a cost function of a subsequent search;
    a search module which searches for a match of the selected model feature to the image to register the feature; and
    an update module which updates the model state for each available frame based on the match found by the search module.

64. The system of claim 63, wherein, at any given time, only one frame is available, frames being available in sequential order, the system further comprising:
    an acquisition module for acquiring sequence frames; and
    a process control module which signals the feature selection module to terminate, and which signals the acquisition module to make available a next frame.

65. The system of claim 64, further comprising:
    a feature list comprising a plurality of entries, an entry for each model feature, wherein all features are initially marked as unmatched, and wherein a feature is marked as matched when it is matched, such that the selection feature module selects only features marked as unmatched.

66. The system of claim 63, further comprising:
    a feature extraction module which extracts features from each available frame in the sequence, wherein the search module performs feature-to-feature matching.

67. The system of claim 63, further comprising:
    a frame preprocessor which identifies regions of available frames which are not searched by the search module.

68. The system of claim 67, wherein the search module performs feature-to-image matching.

69. The system of claim 63, wherein the cost function is based on the feature's basin of attraction.

70. The system of claim 69, wherein the cost function is further based on complexity of searching at each basin of attraction.

71. The system of claim 63, wherein the search module searches in a region of high probability of a match.

72. The system of claim 71 wherein a search region is based on a projected state probability distribution.

73. The system of claim 63, wherein the search module searches based on maximizing a comparison function.

74. The system of claim 63, wherein the selection module and search module are responsive to a propagated state probability distribution.

75. The system of claim 74 wherein the state probability distribution is projected into feature space.

76. The system of claim 63, wherein the search module performs feature-to-feature matching.

77. The system of claim 76, wherein the number of search operations is the number of target features located within each search region.

78. The system of claim 77 wherein the number of target features located within the search region is based on Mahalanobis distances to potential target features.

79. The system of claim 76 wherein target features are approximately uniformly distributed, and the number of features is proportional to the search region's size, and wherein the search module ranks the features according to the sizes of the associated search regions.

80. The system of claim 63 wherein the search module performs feature-to-image matching.

81. The system of claim 80 wherein the selection module, to compute the number of required search operations, for each search region, divides the region into minimally-overlapping volumes having a same size and shape as a basin of attraction associated with the feature, and counts such volumes required to cover the regions.

82. The system of claim 81, wherein the selection module uses an approximation to a volume count, the approximation derived by obtaining eigenvalues and eigenvectors to a covariance matrix associated with the feature search region, calculating a basin of attraction span for each eigenvector direction, and approximating a count responsive to the eigenvalues and the spans.

83. The system of claim 63, wherein the update module updates the model state according to a propagated state probability distribution.

84. The system of claim 83, wherein the propagation of the probability distribution is based on successive registered features.

85. The system of claim 63, wherein the state probability model has a Gaussian distribution.

86. The system of claim 85, wherein the state probability model is propagated using a Kalman filter update step.

87. The system of claim 63, wherein only some of the available features, sufficient to achieve a predetermined level of certainty in an estimate of the model, are registered.

88. The system of claim 63, wherein for each registration task in a training set of registration tasks, an optimal feature ordering is determined by the selection module, the search module and the update module, and wherein a fixed ordering is determined responsive to the optimal feature orderings, such that the object model is registered in the image using the fixed ordering.

* * * * *